US011054649B2

(12) United States Patent
Kim et al.

(10) Patent No.: US 11,054,649 B2
(45) Date of Patent: Jul. 6, 2021

(54) IMAGE DISPLAY OPTICAL APPARATUS AND IMAGE GENERATION METHOD THEREOF

(71) Applicants: Tae Kyung Kim, Seongnam-si (KR); Hyung Won Seo, Seongnam-si (KR)

(72) Inventors: Tae Kyung Kim, Seongnam-si (KR); Hyung Won Seo, Seongnam-si (KR)

( * ) Notice: Subject to any disclaimer, the term of this patent is extended or adjusted under 35 U.S.C. 154(b) by 141 days.

(21) Appl. No.: 16/205,366

(22) Filed: Nov. 30, 2018

(65) Prior Publication Data

US 2019/0171019 A1   Jun. 6, 2019

(30) Foreign Application Priority Data

Dec. 1, 2017 (KR) .................. 10-2017-0164337

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0016* (2013.01); *G02B 2027/0127* (2013.01); *G02B 2027/0132* (2013.01)

(58) Field of Classification Search
CPC .. G02B 27/0172; G02B 6/0016; G02B 6/005; G02B 2027/0132; G02B 2027/0127; G02B 27/0081
See application file for complete search history.

(56) References Cited

U.S. PATENT DOCUMENTS

| 6,768,834 | B1 | 7/2004 | Gruhlke | |
|---|---|---|---|---|
| 8,233,204 | B1 | 7/2012 | Robbins et al. | |
| 10,261,318 | B2 | 4/2019 | Tekolste et al. | |
| 10,746,994 | B2 | 8/2020 | Poon et al. | |
| 2006/0126179 | A1* | 6/2006 | Levola | G02B 27/4205 359/563 |
| 2006/0132914 | A1* | 6/2006 | Weiss | G02B 27/0172 359/462 |
| 2011/0109528 | A1* | 5/2011 | Mun | G02B 27/0172 345/8 |

(Continued)

FOREIGN PATENT DOCUMENTS

| CN | 105934902 | 9/2016 |
|---|---|---|
| CN | 106019568 | 10/2016 |

(Continued)

OTHER PUBLICATIONS

KIPO, Office action dated Jun. 20, 2018, in KR 10-2017-164337 (with trans), 6 pgs.

(Continued)

*Primary Examiner* — Kimberly N. Kakalec
(74) *Attorney, Agent, or Firm* — Henry Patent Law Firm PLLC

(57) ABSTRACT

An image display optical apparatus and an image generating method thereof are disclosed. The image display optical apparatus includes a substrate arranged as at least one layer, at least one first diffractive element located on one side of the substrate and which receives a beam, and a plurality of second diffractive elements arranged at predetermined intervals on the substrate and which output beams diffracted by the at least one first diffractive element and guided through the substrate.

15 Claims, 22 Drawing Sheets

(56) References Cited

U.S. PATENT DOCUMENTS

2013/0063815 A1    3/2013    Kubota
2013/0314793 A1    11/2013   Robbins et al.
2016/0041390 A1    2/2016    Poon et al.

FOREIGN PATENT DOCUMENTS

| CN | 106371222    | 2/2017  |
| CN | 106662678    | 5/2017  |
| CN | 107111204    | 8/2017  |
| CN | 107305291    | 10/2017 |
| JP | 2013-057782 A | 3/2013  |
| KR | 1020160147636 | 12/2016 |
| KR | 20170039294  | 4/2017  |
| WO | 2015081313   | 6/2015  |
| WO | 2017181864   | 10/2017 |

OTHER PUBLICATIONS

KIPO, Office Action dated Dec. 27, 2018, in KR 10-2017-0164337, 55 pgs.
EPO, Partial European Search Report dated Jun. 3, 2019, in EP18208920.1, 16 pgs.
CNIPA, First Office Action dated Nov. 4, 2020, in CN 201811451190.3, 30 pgs.

* cited by examiner

IMAGE DISPLAY OPTICAL APPARATUS AND IMAGE GENERATION METHOD THEREOF

CROSS-REFERENCE TO RELATED APPLICATION

This application claims the benefit of Korean Patent Application No. 10-2017-0164337, filed on Dec. 1, 2017, in the Korean Intellectual Property Office, the disclosure of which is incorporated herein in its entirety by reference.

BACKGROUND

1. Field

One or more embodiments relate to an optical apparatus and an image generating method thereof, and more particularly, to an optical apparatus for displaying an image of virtual reality or augmented reality by causing a beam to be incident to a pupil, and an image generating method thereof.

2. Description of the Related Art

Currently, there exist head mounted displays (HMDs) for displaying virtual reality or augmented reality, and various other kinds of wearable display devices. However, changing the focal distance of an object rendered in virtual reality or augmented reality is difficult for existing display devices, and thus, there is a limitation to rendering of the depth of an object, such that the usage of existing display devices for a long time will increase fatigue. In addition, due to their bulkiness, it is inconvenient to wear or carry such devices.

SUMMARY

One or more embodiments include an image display optical apparatus capable of rendering the depth of an object in virtual reality or augmented reality.

One or more embodiments include an image generating method of rendering the depth of an object in virtual reality or augmented reality.

Additional aspects will be set forth in part in the description which follows and, in part, will be apparent from the description, or may be learned by practice of the presented embodiments.

According to one or more embodiments, there is provided an image display optical apparatus including: a substrate arranged as at least one layer; at least one first diffractive element located on one side of the substrate and which receives a beam; and a plurality of second diffractive elements arranged at predetermined intervals on the substrate and outputting beams diffracted by the at least one first diffractive element and guided through the substrate.

According to one or more embodiments, there is provided a method of generating an image for an optical apparatus including at least one first diffractive element which receives beams and a plurality of second diffractive elements arranged at predetermined intervals and which output the beams, wherein the at least one first diffractive element and the plurality of second diffractive elements are located on a substrate arranged as one or more layers, the method including: determining a position of a pupil; determining an output position of a beam let that outputs a pixel and is output to the pupil by using a beamlet output position function defined by input values of an angle at which the pixel is incident to a first diffractive element, a distance between the substrate and the pupil, and a parameter of each diffractive element; determining an output angle of the beamlet based on depth information of the pixel and the output position of the beamlet; determining a shifting amount of each pixel based on a ratio of the output angle to an angle formed by a size of one pixel; and performing, for each layer of the substrate, a process of generating a shift image by shifting each pixel of an original image according to the shifting amount.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
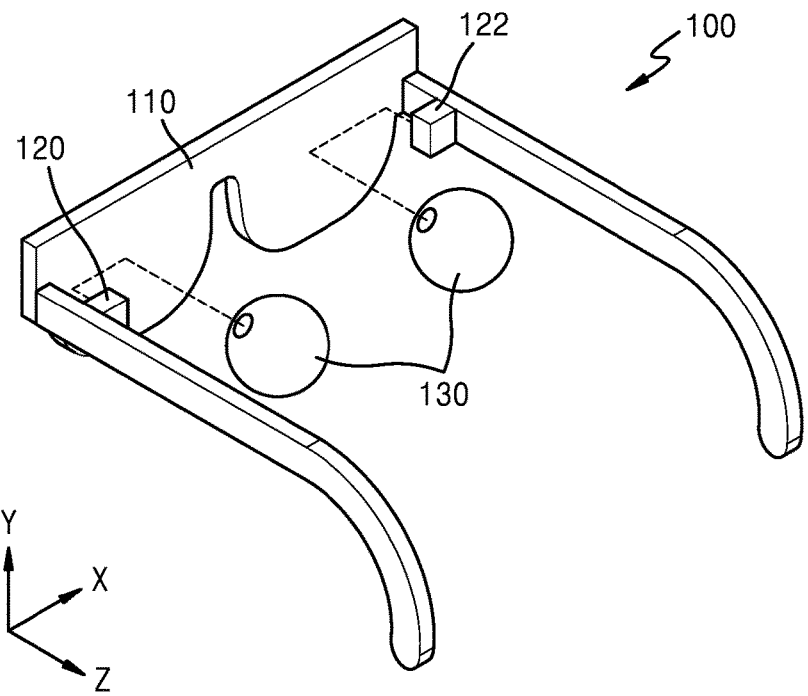
FIG. 1 is a view showing an example application of an image display optical apparatus according to the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, an image display optical apparatus and an image generating method thereof according to one or more embodiments of the present disclosure will be described in detail with reference to the accompanying drawings.

FIG. 1 is a view showing an example application of an image display optical apparatus 100 according to the present disclosure.

Referring to FIG. 1, the image display optical apparatus 100 implemented in the form of a spectacle includes patterns of a plurality of diffractive elements (see FIG. 3 and below) formed on a substrate 110. The image display optical apparatus 100 outputs to user eyes 130 image beams output from image generators 120 and 122 by using a plurality of diffractive elements. A substrate may be made of a transparent material such as optical glass or optical plastic, and the substrate may be configured to cause light from the real world to transmit through the substrate when rendering augmented reality. As another example, when rendering virtual reality, light shielding means may be arranged on the substrate on the opposite side of the eyes to block light from the real world. In addition, the transparency of the substrate may be modified variously according to one or more embodiments.

The image display optical apparatus 100 including the image generators 120 and 122 is illustrated in the present embodiment, but the present disclosure is not limited thereto. The image generators 120 and 122 may not be included in the configuration of the image display optical apparatus 100.

Each of the image generators 120 and 122 generates an image output to each of the eyes 130. In another embodiment, one of the image generators 120 or 122 may generate all images output to both of the eyes 130. In another embodiment, the image generators 120 and 122 may generate and output stereoscopic images. In another embodiment, the image generators 120 and 122 may generate a light field image.

The present embodiment is merely an example for facilitating an understanding of the present disclosure, and the structure and type of the image display optical apparatus 100 may be modified variously. For example, the image display optical apparatus 100 may be implemented in various existing HMD types (video see-through or optical see-through). Although the present embodiment shows a case of outputting an image to both of the eyes 130, in another embodiment, an image display optical apparatus that outputs an image to only one of the eyes may be implemented. In addition, positions of the image generators 120 and 122 may be modified variously according to a shape of the image display optical apparatus 100 that is implemented.

In another embodiment, the image display optical apparatus 100 may further include a pupil tracking unit (not shown). The pupil tracking unit detects a position of a pupil in real time. Various existing methods of tracking the pupil may be applied to the present embodiment. The pupil tracking unit may be located on one side of the substrate 110, and a shape and a position of the pupil tracking unit may be modified variously according to one or more embodiments.

In another embodiment, the image display optical apparatus 100 may further include a light quantity controller (not shown). Since a size of the pupil varies between about 2 and about 7 mm according to a quantity of incident light, the light quantity controller adjusts the quantity of light to cause the size of the pupil to remain unchanged. The light quantity controller may adjust the quantity of light incident on the pupil by using additional illumination or by adjusting the light quantity of incident beam output from the image generators 120 and 122. For example, after determining the size of the pupil, the light quantity controller may feedback control the light quantity of the illumination or the incident beam to cause the size of the pupil to remain at a certain size. Various existing methods may be applied to determine the size of the pupil. As another example, the light quantity controller may feedback control the light quantity of the illumination or the incident beam to cause the luminance to remain constant after determining the luminance around the pupil, where the luminance depends on the brightness of the real world and the brightness of an image output from the substrate. The light quantity controller may be located at one side of the substrate 110, and a shape and a position of the light quantity controller may be modified variously according to one or more embodiments.

Figure 2:
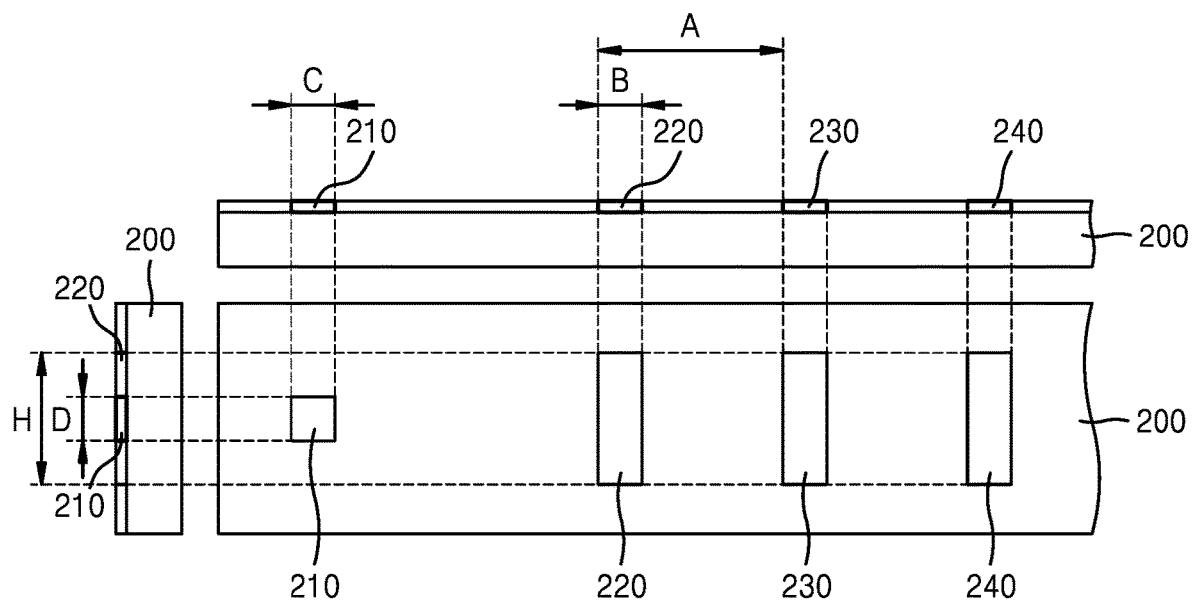
FIG. 2 is a view showing a first embodiment of the image display optical apparatus according to the present disclosure.

FIG. 2 is a view showing a first embodiment of the image display optical apparatus 100 according to the present disclosure.

FIG. 2 respectively shows a front view looked from the z-axis of the image display optical apparatus 100 of FIG. 1 and a left-side view and a plan view thereof. Besides, FIG. 2 shows a portion of the patterns of diffractive elements formed on the substrate of the image display optical apparatus 100. The image display optical apparatus 100 may be implemented to output an image to only one of the eyes or to both of the eyes. When outputting an image to both of the eyes, since the patterns of a plurality of diffractive elements for a left eye and those for a right eye are symmetric to each other, only image patterns for one of the eyes will be illustrated and described in the following embodiments including the present embodiment.

Referring to FIG. 2, the image display optical apparatus 100 may include a plurality of diffractive elements 210, 220, 230, and 240 formed on a substrate 200. The substrate 200 forms an optical waveguide that propagates by total internal reflection (TIR) of beams diffracted by the diffractive element 210.

The plurality of diffractive elements 210, 220, 230 and 240 may be formed in a particular pattern on the front side or the rear side of the substrate 200 by using a photopolymer. In one embodiment, a portion of the plurality of diffractive elements 210, 220, 230, and 240 may be located on the front side of the substrate 200 and the remaining thereof may be located on the rear side of the substrate 200.

The plurality of diffractive elements 210, 220, 230, and 240 may be implemented as a structure like surface relief grating (SRG), volume holographic grating (VHG) or polarization volume grating (PVG), the diffraction angle or the diffraction ratio of respective diffractive elements 210, 220, 230, and 240 may be set by adjusting grating height or refractive index modulation size or rotation angle of anisotropic materials such as liquid crystal. In addition, respective diffractive elements 210, 220, 230, and 240 are not limited to the example described above and may be implemented by various existing structures.

The plurality of diffractive elements 210, 220, 230, and 240 may include first diffractive element 210 that receives external beams and second diffractive elements 220, 230, and 240 that output beams guided through the substrate 200. The first diffractive element 210 which receives incident beams from the front side diffracts the incident beams towards the direction of the second diffractive elements in first diffraction range. The second diffractive elements 220, 230, and 240 diffract guided beams in second diffraction range and outputs diffracted beams. According to one or more embodiments, the first diffraction range and the second diffraction range may be identical or different.

Each of the second diffractive elements 220, 230, and 240 outputs beam lets with various angles. For example, each of the second diffractive elements 220, 230, and 240 may output beamlets of various angles between about −15 degrees and about 15 degrees with the z-axis as zero degree reference. A beamlet refers to a collimated beam. An output angle of the beamlet may be modified variously according to diffraction range of each of the second diffractive elements 220, 230, and 240. In the following embodiments including the present embodiment, the angle of beam lets output from the second diffractive elements 220, 230, and 240 is referred to as the angle of view.

The second diffractive elements 220, 230, and 240 are arranged on the substrate 200 at predetermined intervals, e.g., A. An interval A of the second diffractive elements 220, 230, and 240 may be set variously according to one or more embodiments, but the interval A may be an interval that is capable of causing at least one of beamlets with a certain angle of view among beamlets with various angle of views output from each of the second diffractive elements 220, 230, and 240 to be incident to the pupil. For example, the interval A between the second diffractive elements 220, 230, and 240 may be an interval corresponding to the diameter of the pupil, e.g., 4 mm, which is to cause at least one among beamlets with an angle of view of 10 degrees output from each of the second diffractive elements 220, 230, and 240 to be incident to the pupil.

A ratio of transmission to diffraction of all the second diffractive elements 220, 230 and 240 may be identical. In another embodiment, all or some of the second diffractive elements 220, 230 and 240 may have different ratios of transmission to diffraction. For example, after the beams guided through the substrate 200 being partially diffracted by the first 220 of the second diffractive elements, the beams remained reach the second 230 of the second diffractive elements. When the diffraction ratio of all the second diffractive elements 220, 230, and 240 are identical, the quantity of light output from the first 220 and the second 230 of the second diffractive elements may be different from each other. Thus, the diffraction ratio of the second diffractive elements 220, 230, and 240 may be made higher as the second diffractive elements 220, 230, and 240 are farther from the first diffractive element 210 in order to make the light quantity of the beamlets output from the second diffractive elements 220, 230, and 240 identical.

The size of the first diffractive element 210 and the size of the second diffractive elements 220, 230, and 240 may be implemented as identical to or different from each other. For example, the width B of the first diffractive element 210 and the width C of the second diffractive elements 220, 230, and 240 may be identical, and respective heights D and H may be different. As another example, the height D of the first diffractive element 210 and the height H of the second diffractive elements 220, 230, and 240 may be identical, and the width B of the first diffractive element 210 and the width C of the second diffractive elements 220, 230, and 240 may be different from each other. The size of the beamlets output from the second diffractive elements 220, 230, and 240 may be adjusted according to the size of the width B of the second diffractive elements 220, 230, and 240. For example, when the width of the second diffractive elements 220, 230 and 240 is implemented as 0.5 mm, the size of output beamlet may be 0.5 mm, and when the width of the second diffractive elements 220, 230 and 240 is implemented as 1 mm, the size of the output beam let may be 1 mm.

Figure 3:
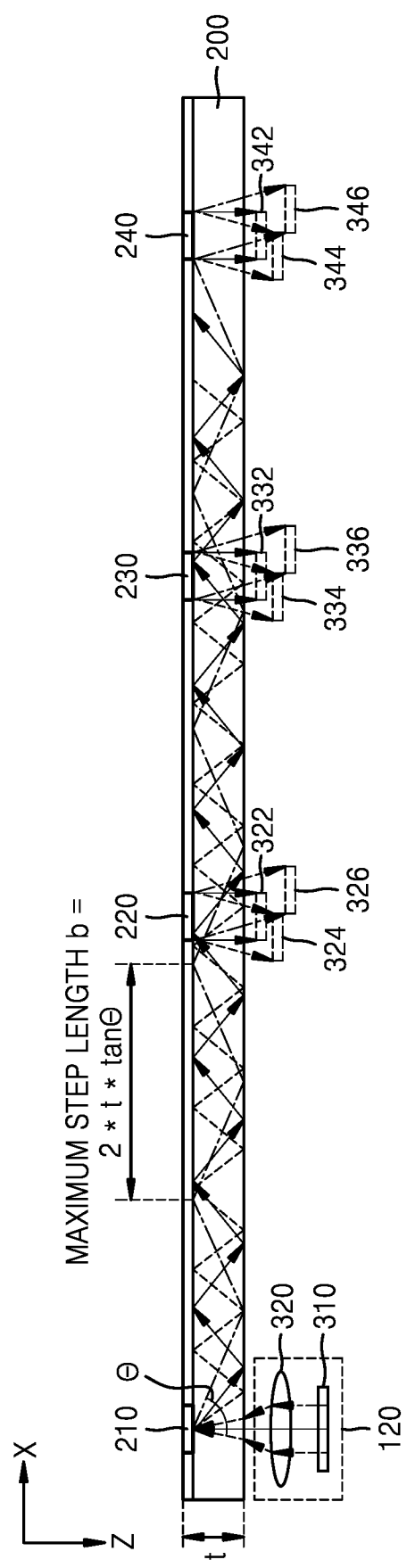
FIG. 3 is a view showing an example of movement paths of beams, according to the first embodiment in FIG. 2.

FIG. 3 is a view showing an example of movement paths of beams, according to the first embodiment in FIG. 2.

Referring to FIG. 3, the first diffractive element 210 receives an image beam from the image generator 120. The image generator 120 may output an image that is output by a display unit 310 as collimated beams with a certain range of angles, e.g., plus or minus 15 degrees, by using lens 320.

A beam incident to the first diffractive element 210 is diffracted by the first diffractive element 210 and is guided through the substrate 200. The second diffractive elements 220, 230, and 240 diffract the guided beams and output beamlets 322, 324, 326, 332, 334, 336, 342, 344, and 346 within a certain range of angles. The present embodiment illustrates respective beamlets 322, 324, 326, 332, 334, 336, 342, 344, and 346 with an angle of zero degree and plus or minus 15 degrees output from the second diffractive elements 220, 230, and 240 when the collimated beams in the range of about −15 to about 15 degrees are incident to the first diffractive element 210.

When the size of the beam lets are less than a certain size, e.g., 0.5 mm or less, adjusting the focal point on the retina by only one of the beamlets is difficult. Accordingly, to cause the size of the beam lets to be greater than a certain size, e.g., 1 mm or more, the size of the incident beams and the width B of the second diffractive elements 220, 230, and 240 may be greater than a certain size, or multiple layers shown in FIG. 11 may be formed to cause a plurality of beamlets less than a certain size to be incident to the pupil.

Figure 4:
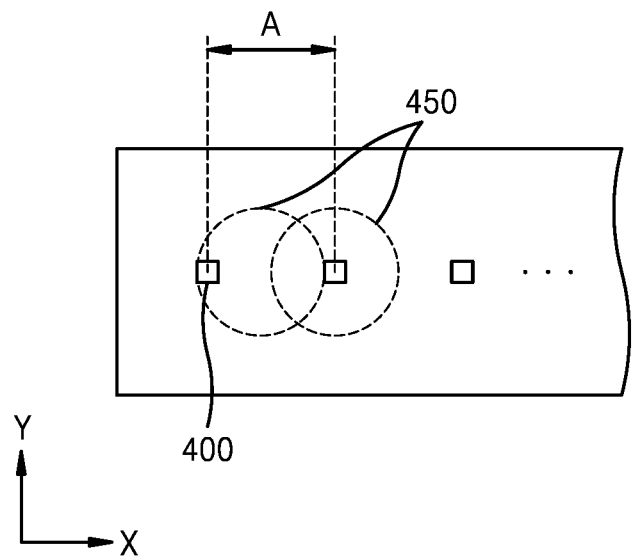
FIG. 4 is a view illustrating an example of output patterns of a beamlet shown in the first embodiment of FIG. 2.

FIG. 4 is a view illustrating an example of output patterns of a beamlet 400 shown in the first embodiment of FIG. 2.

Referring to FIG. 4, the output patterns of the beamlet 400 output from each of the second diffractive elements 220, 230, and 240 by a certain angle, e.g., 0 degree, are shown. The output patterns of the beamlet 400 output from each of the second diffractive elements 220, 230, and 240 are arranged at an interval identical to the interval A between the second diffractive elements 220, 230, and 240.

For example, when the interval A of the second diffractive elements 220, 230, and 240 is less than the diameter of a pupil 450, e.g., 4 mm, at least one beam let 400 with a certain angle is incident on the pupil 450 when the pupil 450 moves in the lateral direction.

Figure 5:
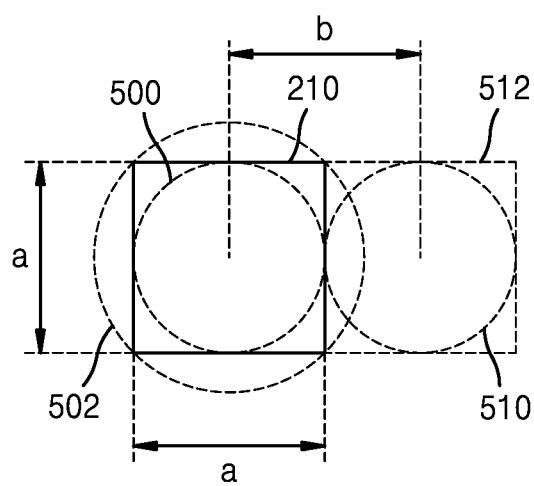
FIG. 5 is a view showing an example of the size of a first diffractive element of the first embodiment in FIG. 2.

FIG. 5 is a view showing an example of the size of the first diffractive element 210 of the first embodiment in FIG. 2.

Referring to FIG. 5, the width a of the first diffractive element 210 may be equal to or greater than a maximum step length b of a beam or may be equal to or less than the diameter of incident beams 500 and 502 to eliminate gap between the beams diffracted by the first diffractive element 210 and guided through the substrate 200. When the thickness of a substrate is t and the diffraction angle of a beam diffracted by the first diffractive element is θ, the step length b of the beam is b=2*t*tan θ as shown in FIG. 3.

For example, when the diameter of the beam 500, the width a of the first diffractive element 210, and the maximum step length b of the beam are all set to be equal, a beam 510 diffracted by the first diffractive element 210 may be guided without any gap. As another example, when the size of the first diffractive element 210 is less than the size of the beam 502, and the width a of the first diffractive element 210 is equal to the maximum step length b of the beam, a beam 512 having the same size as that of the first diffractive element 210 may be guided without any gap.

The second diffractive elements 220, 230, and 240 may output beamlets of fixed size having the width of the second diffractive elements 220, 230, and 240 regardless of an interval between the first diffractive element 210 and the second diffractive elements 220, 230, and 240 when the beam is guided without any gap.

Various configurations of the first embodiment illustrated in FIGS. 2 to 5 may be applied to other embodiments shown in FIG. 6 and there below.

Figure 6:
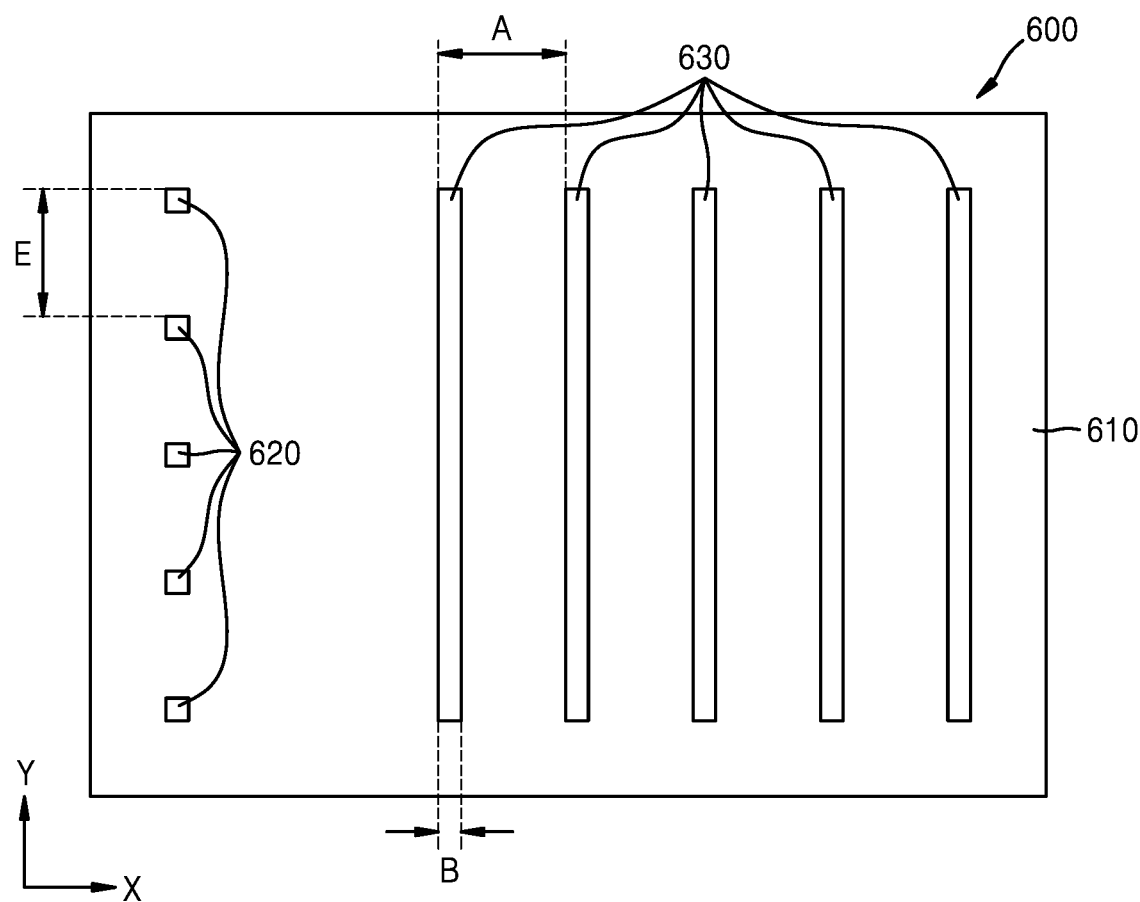
FIG. 6 is a view showing a second embodiment of an image display optical apparatus according to the present disclosure.

FIG. 6 is a view showing a second embodiment of an image display optical apparatus 600 according to the present disclosure.

Referring to FIG. 6, the image display optical apparatus 600 may include a plurality of first diffractive elements 620 and a plurality of second diffractive elements 630, where the plurality of first diffractive elements 620 and the plurality of second diffractive elements 630 are formed on a substrate 610. Each of the plurality of first diffractive elements 620 receives an image beam. The plurality of first diffractive elements 620 may be arranged at predetermined intervals, e.g., E, along the y-axis direction. An interval E between the plurality of first diffractive elements 620 may be modified variously according to one or more embodiments, however, the interval E may be an interval capable of causing at least one of beamlets diffracted by the plurality of first diffractive elements 620 to be incident to the pupil through the plurality of second diffractive elements 630. For example, the interval E of the plurality of first diffractive elements 620 may be an interval corresponding to the diameter of the pupil, e.g., 4 mm. A size of respective first diffractive elements 620 may be identical to the size of the first diffractive element 210 of the first embodiment illustrated in FIG. 5.

The plurality of second diffractive elements 630 have a certain length in the y-axis direction capable of diffracting and outputting the beams diffracted by the plurality of first diffractive elements 620 and guided through the substrate 610. Intervals, e.g., A, between the plurality of second diffractive elements 630 are identical to those described in the first embodiment of FIGS. 2 to 5.

Figure 7:
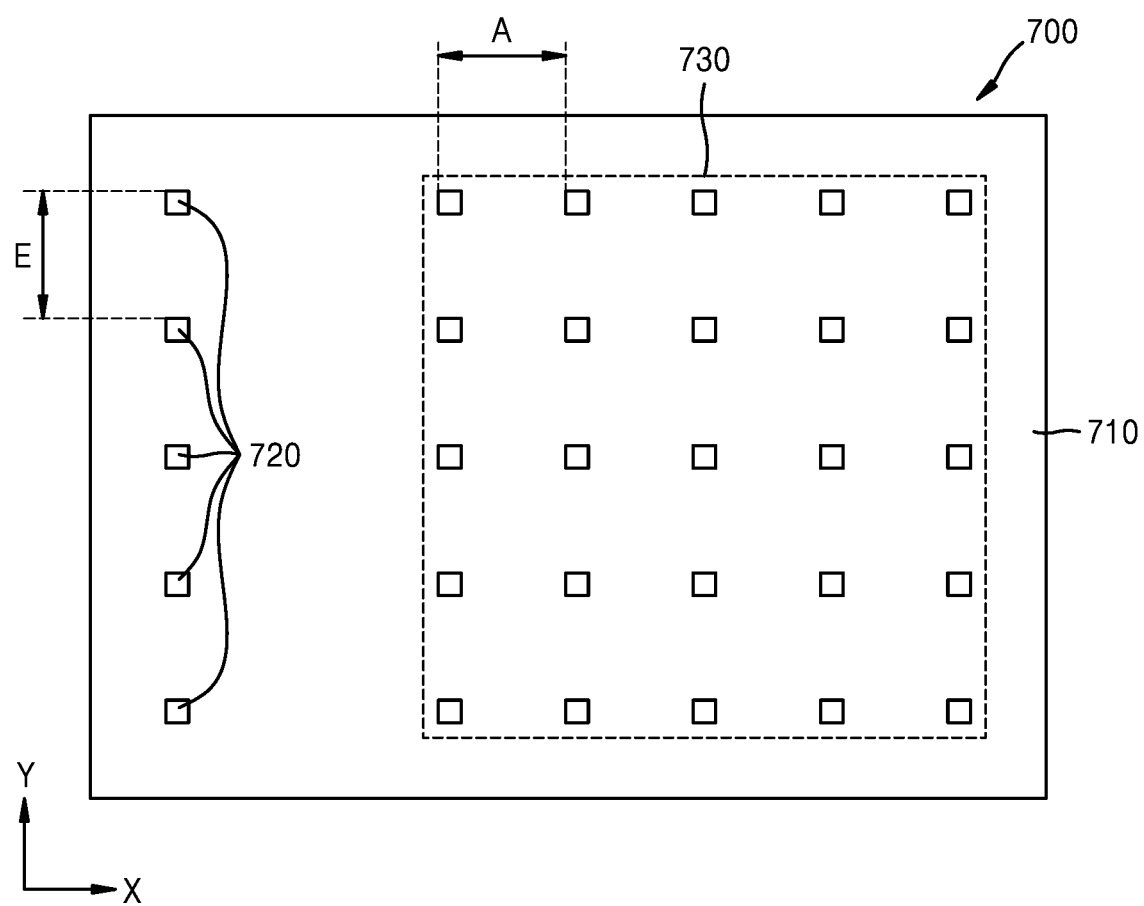
FIG. 7 is a view showing a third embodiment of an image display optical apparatus according to the present disclosure.

FIG. 7 is a view showing a third embodiment of an image display optical apparatus 700 according to the present disclosure.

Referring to FIG. 7, the image display optical apparatus 700 may include a plurality of first diffractive elements 720 and a plurality of second diffractive elements 730, where the plurality of first diffractive elements 720 and the plurality of second diffractive elements 730 are formed on a substrate 710. The third embodiment differs from the second embodiment of FIG. 6 merely in a pattern of the plurality of second diffractive elements 730, and the remaining configurations thereof are identical.

Figure 8:
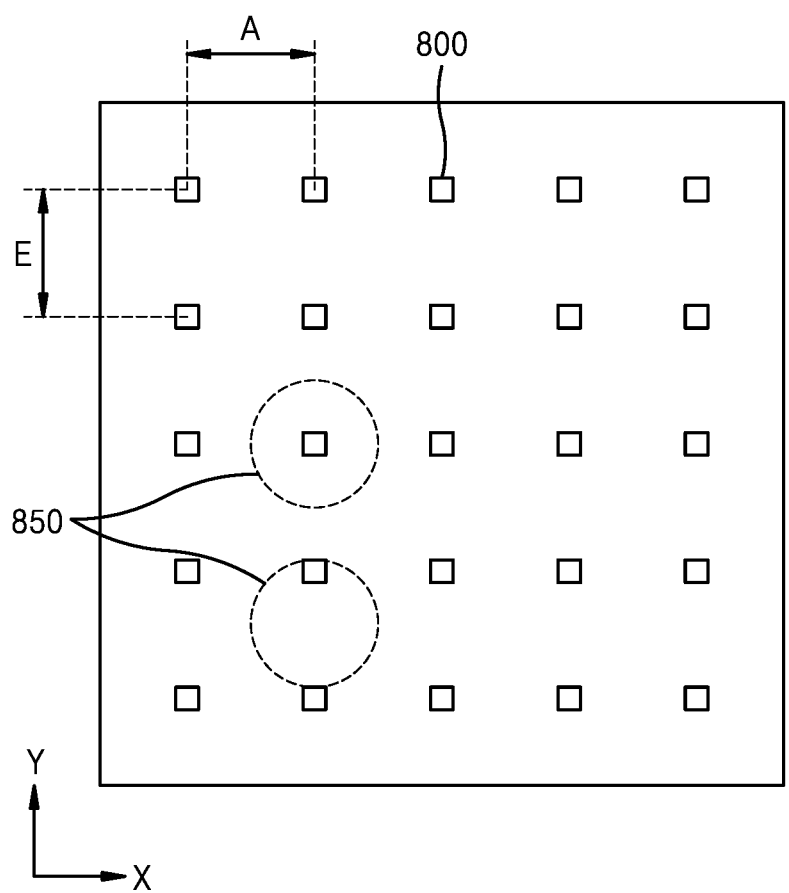
FIG. 8 is a view showing an example of output patterns of a beam let shown in the second embodiment of FIG. 6 and the third embodiment of FIG. 7.

FIG. 8 is a view showing an example of output patterns of a beam let shown in the second embodiment of FIG. 6 and the third embodiment of FIG. 7.

Referring to FIG. 8, the output patterns of the beamlet 800 output from the plurality of second diffractive elements 630 or 730 of the second or the third embodiments by a certain angle, e.g., 0 degree, are shown. The output patterns of the beamlet 800 output from each of the plurality of second diffractive elements 630 or 730 have an interval E identical to the interval E of the plurality of first diffractive elements 620 and 720 in the y-axis direction and an interval A identical to the interval A of the plurality of second diffractive elements 630 and 730 in x-axis direction. For example, when the interval E of the plurality of first diffractive elements 620 and 720 and the interval A of the plurality of second diffractive elements 630 and 730 are all less than the diameter of the pupil, e.g., 4 mm, at least one beam let with a certain angle is incident on a pupil 850 even though the pupil 850 moves in any direction on the x-y plane.

Figure 9:
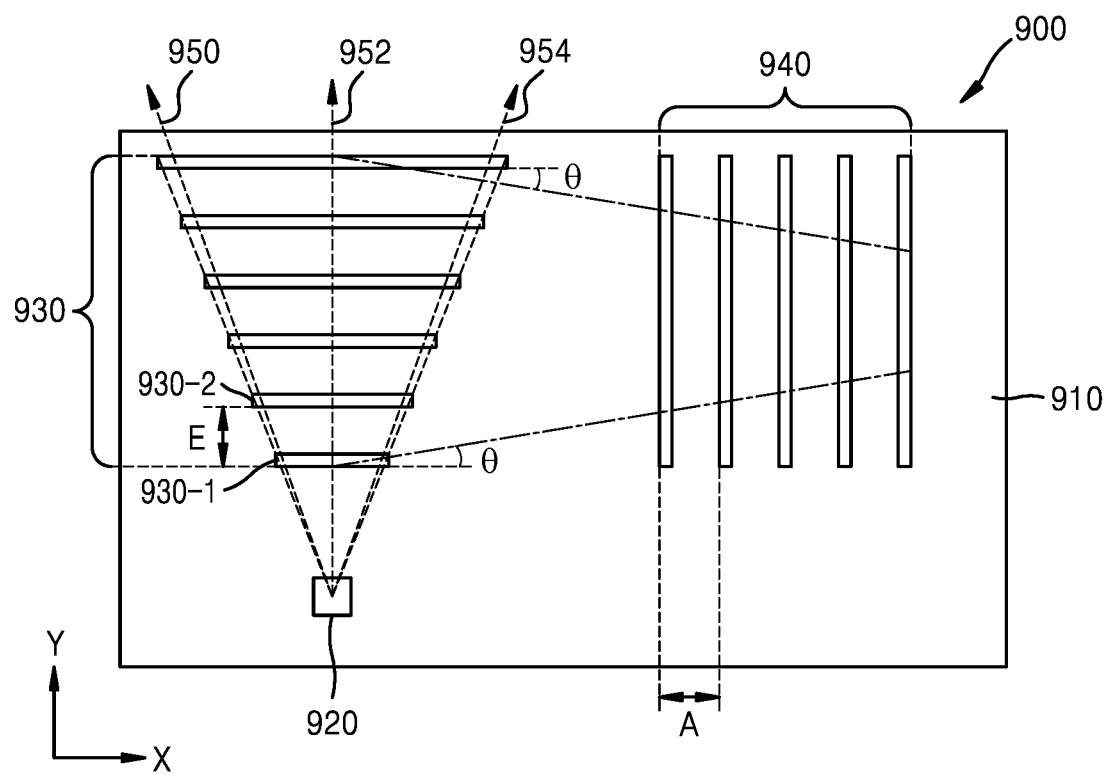
FIG. 9 is a view showing a fourth embodiment of an image display optical apparatus according to the present disclosure.

FIG. 9 is a view showing a fourth embodiment of an image display optical apparatus 900 according to the present disclosure.

Referring to FIG. 9, the image display optical apparatus 900 may include a first diffractive element 920, a plurality of second diffractive elements 940, and a plurality of third diffractive elements 930, where the first diffractive element 920, the plurality of second diffractive elements 940, and the plurality of third diffractive elements 930 are formed on a substrate 910.

The first diffractive element 920 diffracts beams incident from the front side towards the plurality of third diffractive elements 930, and each of the plurality of third diffractive elements 930 diffracts the beams towards the plurality of second diffractive elements 940. The plurality of second diffractive elements 940 output beamlets.

In order to form the output patterns of the beamlet of FIG. 8, the second embodiment of FIG. 6 and the third embodiment of FIG. 7 include the plurality of first diffractive elements 620 and 720. In this case, each of the plurality of first diffractive elements 620 and 720 receives beams. Contrarily, the fourth embodiment of FIG. 9 includes the plurality of third diffractive elements 930 to cause the output patterns of the beamlet as shown in FIG. 8 to be formed by only the first diffractive element 920 receiving the beams.

The plurality of third diffractive elements 930 are arranged in a shape of inverted trapezoid to diffract all beamlets 950, 952, and 954 output from the first diffractive element 920 with a certain angle and propagate to the plurality of second diffractive elements 940. Inverse trapezoidal arrangement of the plurality of third diffractive elements 930 is merely an example, and an arrangement thereof may be modified into various other shapes, which is capable of diffracting the beamlets 950, 952, and 954 diffracted by the first diffractive element 920. For example, each of the plurality of third diffractive elements 930 may be arranged in a quadrangular shape having a same length in the x-axis direction.

Ratios of transmission to diffraction of all of the plurality of third diffractive elements 930 may be identical. In another embodiment, the ratios of transmission to diffraction of a portion of or all of the plurality of third diffractive elements 930 may be different from each other. For example, a ratio of transmission to diffraction may be made higher as each of the plurality of third diffractive elements 930 is farther from the first diffractive element 920. After beams being partially diffracted by the first 930-1 of the third diffractive elements, the beams remained reach the second 930-2 of the third diffractive elements. Therefore, when the diffraction ratio of all the third diffractive elements are identical, the quantity of light diffracted by the first 930-1 of the third diffractive elements and the second 930-2 of the third diffractive elements may be different from each other. Accordingly, the diffraction ratio of each of the plurality of third diffractive elements 930 may be made different from each other in order to make the quantity of light diffracted by respective third diffractive elements 930 identical.

The plurality of third diffractive elements 930 may be arranged at predetermined intervals, e.g., E, along the y-axis direction. An interval E between the plurality of third diffractive elements 930 may be set variously according to one or more embodiments. For example, for incident beams with an angle of view of plus or minus A degrees, the interval E may be an interval that is capable of causing at least one, for each angle of view, among beamlets output from the plurality of third diffractive elements 930 (for the present embodiment, beamlets output from each position of six third diffractive elements) to be incident on the pupil. For example, the interval E of the plurality of third diffractive elements 930 may be an interval corresponding to the diameter of the pupil, e.g., 4 mm. A width of each of the plurality of third diffractive elements 930 in y-axis may be equal to a width of each of the plurality of second diffractive elements 940 in x-axis.

The plurality of second diffractive elements 940 output beams guided and diffracted by the plurality of third diffractive elements 930. For example, the plurality of second diffractive elements 940 may be implemented in the same manner as the plurality of second diffractive elements 630 described in the second embodiment of FIG. 6.

Figure 10:
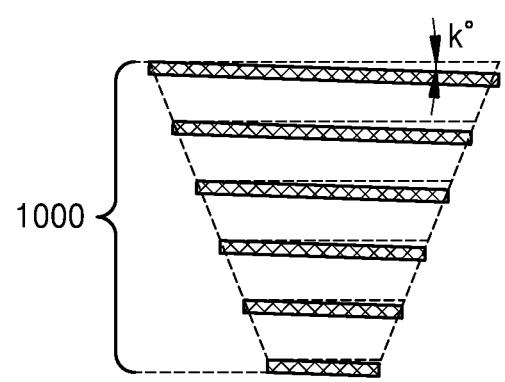
FIG. 10 is a view showing another example of a plurality of third diffractive elements of the fourth embodiment in FIG. 9.

FIG. 10 is a view showing another example of the plurality of third diffractive elements 930 of the fourth embodiment in FIG. 9.

Referring to FIG. 10, a plurality of third diffractive elements 1000 are inclined by a predetermined angle, e.g., k degrees, in relation to the lateral direction. When the plurality of third diffractive elements 930 are arranged in the lateral direction as shown in FIG. 9, beams with zero degree guided from the plurality of third diffractive elements 930 to the plurality of second diffractive elements 940 may be diffracted many times by the plurality of third diffractive elements 930, and thereby the quantity of light may be reduced.

Accordingly, a reduction in the quantity of light may be prevented by reducing the number of diffraction of the beams with zero degree as a result of tilting the plurality of third diffractive elements 1000 at the predetermined angle in relation to the lateral direction. A tilting angle, e.g., k degrees, of the plurality of third diffractive elements 1000 may be set variously according to one or more embodiments.

The first to fourth embodiments described so far have a structure in which patterns of a plurality of diffractive elements are formed on one layer of the substrate. When the size of the beamlets output from the second diffractive elements is less than a certain size, e.g., 0.5 mm or less, adjusting the focal point on the retina is unfeasible. Therefore, the size of the beamlets has to be greater than a certain size, e.g., 1 mm or more, in the first to fourth embodiments. When the focal point is unable to be formed for the size of the beamlets output from the second diffractive elements is less than a certain size, diffractive elements may be configured into the multiple layers to cause the plurality of the beam lets to adjust the focal point on the retina as shown in FIG. 11 and there below.

Figure 11:
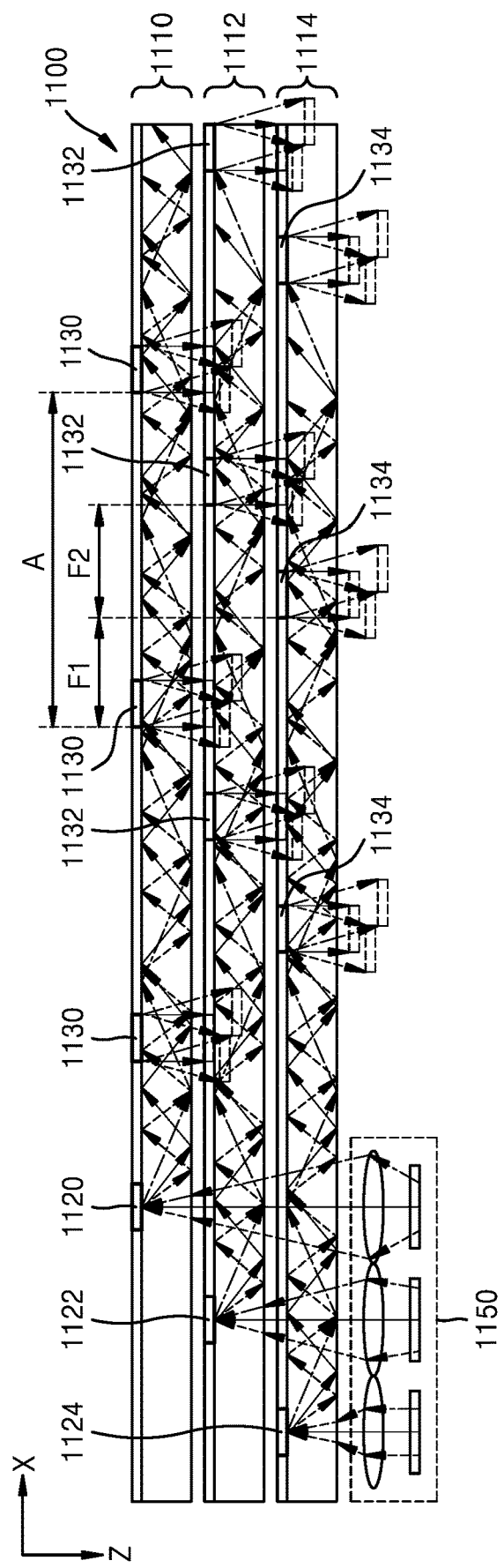
FIG. 11 is a view showing a fifth embodiment of the image display optical apparatus according to the present disclosure.

FIG. 11 is a view showing a fifth embodiment of an image display optical apparatus 1100 according to the present disclosure.

Referring to FIG. 11, the image display optical apparatus 1100 may include a substrate arranged as a plurality of layers 1110, 1112, and 1114 and a plurality of diffractive elements 1120, 1122, 1124, 1130, 1132 and 1134 formed on each of the plurality of layers. Each of the plurality of layers 1110, 1112, and 1114 in FIG. 11 may be implemented in the same manner as one of the first embodiment of FIG. 2, the second embodiment of FIG. 6, and the third embodiment of FIG. 7.

The second diffractive elements 1130, 1132, or 1134 located on a same layer of the substrate are arranged at predetermined intervals as in the first to fourth embodiments. The second diffractive elements 1130, 1132, 1134 located on different layers 1110, 1112, and 1114 of the substrate are arranged without overlapping each other in the x-axis direction. For example, the second diffractive elements located on the different layers 1110, 1112, and 1114 of the substrate, e.g., 1130 vs. 1132, 1132 vs. 1134, and 1134 vs. 1130, are arranged in a manner that spaces apart the second diffractive elements at predetermined intervals F1 and F2 in the x-axis direction.

As an example, the intervals F1 and F2 between the second diffractive elements located on different layers of the substrate, e.g., 1130 vs. 1132, 1132 vs. 1134, and 1134 vs. 1130, may be set to be an interval obtained by equally dividing the interval A between the second diffractive elements 1130, 1132, or 1134 located on a same layer of the substrate. For example, when the interval A between the second diffractive elements 1130, 1132, and 1134 of each of the layers 1110, 1112, and 1114 is 4 mm that corresponds to the diameter of the pupil, the interval F1 between the second diffractive element 1130 of first layer 1110 and the second diffractive element 1134 of third layer 1114 may be implemented as about 1.3 mm and the interval F2 between the second diffractive element 1132 of the second layer 1112 and the second diffractive element 1134 of third layer 1114 may be implemented as about 1.3 mm. The intervals F1 and F2 between the second diffractive elements 1130, 1132, and 1134 of respective layers 1110, 1112, and 1114 may be modified variously according to one or more embodiments.

Figure 16:
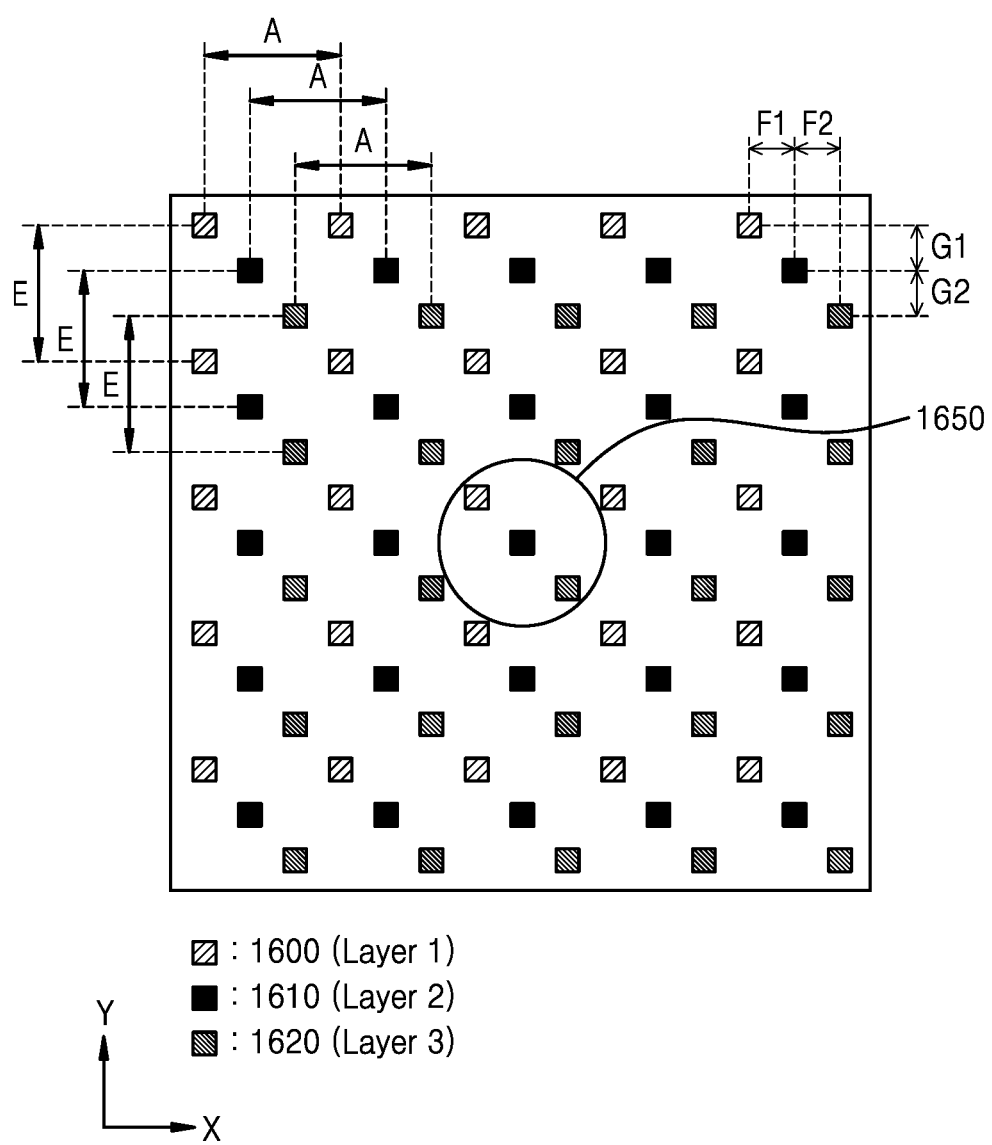
FIG. 16 is a view showing an example of output patterns of beamlets shown in the fifth to seventh embodiments illustrated in FIGS. 11 to 15.

When the second diffractive elements 1130, 1132, or 1134 located on a same layer of the substrate are arranged with an interval that is less than the diameter of the pupil, and the second diffractive elements 1130, 1132, and 1134 of the respective layers 1110, 1112, and 1114 are arranged without overlapping each other in the x-axis, output patterns of a beam let of the respective layers have predetermined intervals in the x-axis direction as shown in FIG. 16.

Figure 14:
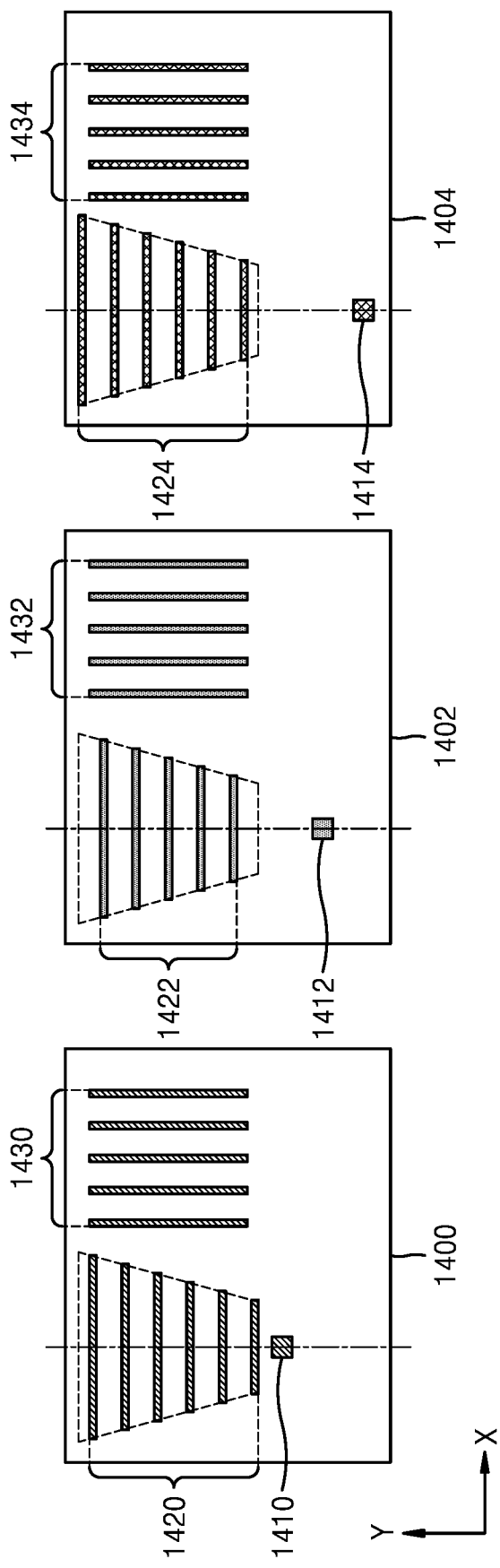
FIGS. 14 and 15 are views showing a seventh embodiment of an image display optical apparatus according to the present disclosure.
Figure 15:
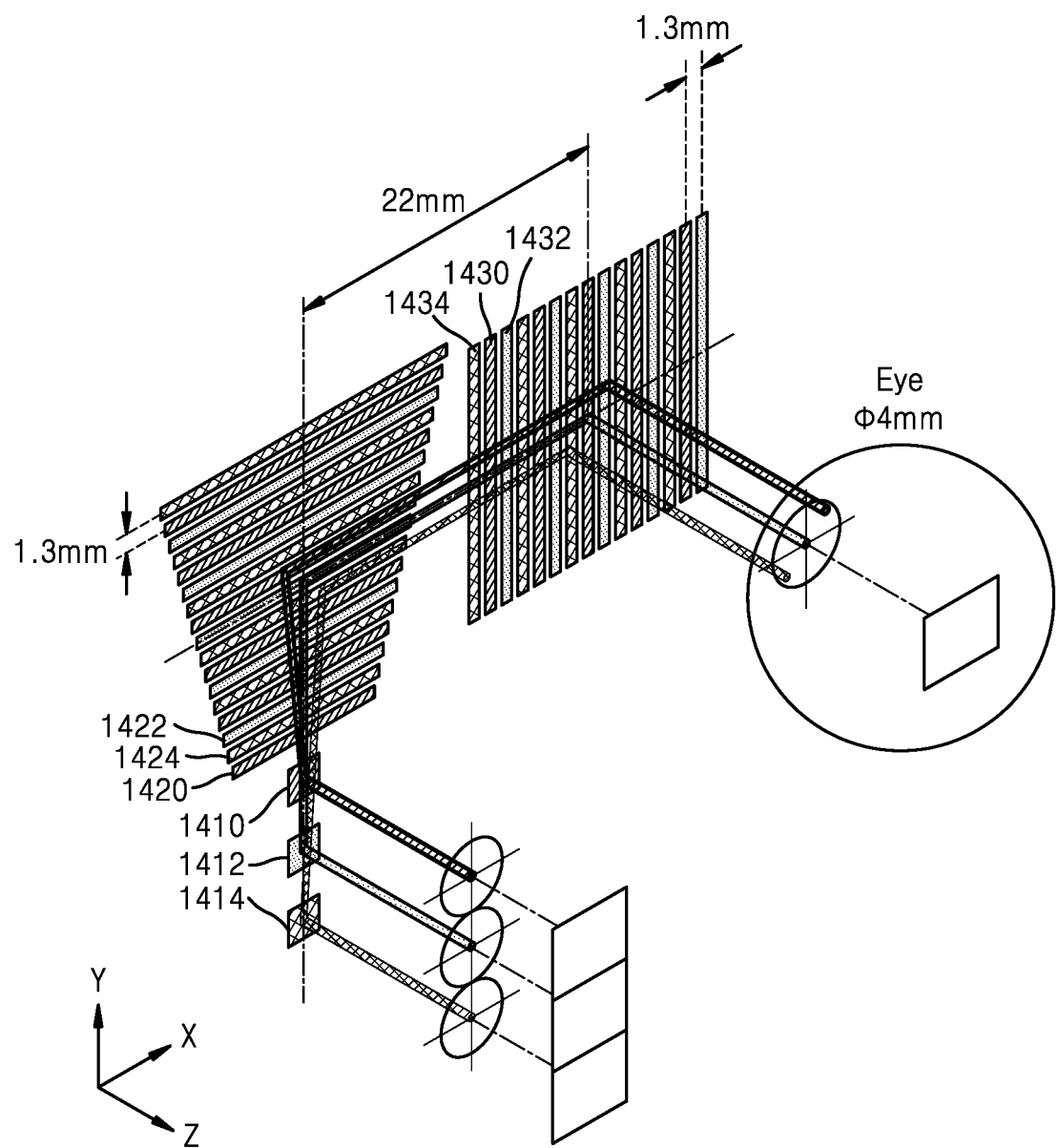

In this embodiment, the first diffractive elements 1120, 1122, and 1124 of the respective layers 1110, 1112, and 1114 are arranged apart from each other in the x-axis direction, but this is merely an example, and the first diffractive elements 1120, 1122, and 1124 of the respective layers 1110, 1112 and 1114 may be arranged apart from each other on the x-y plane. For example, as shown in FIGS. 14 and 15, the first diffractive elements 1120, 1122, and 1124 of the respective layers 1110, 1112, and 1114 may be arranged without overlapping each other in the y-axis direction.

Figure 12:
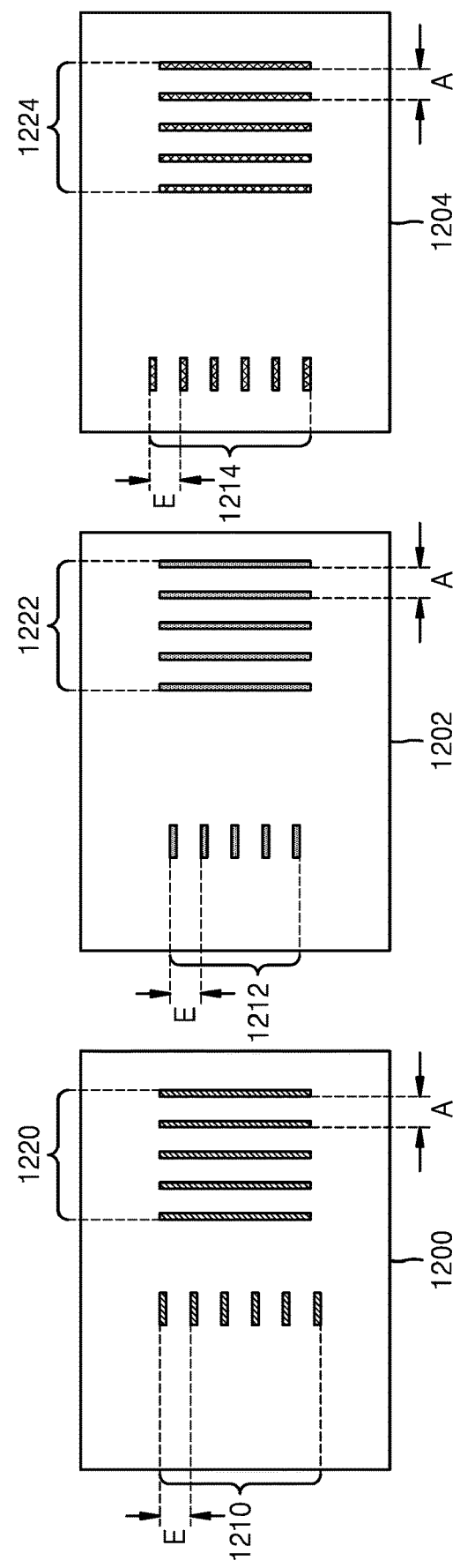
FIGS. 12 and 13 are views showing a sixth embodiment of an image display optical apparatus according to the present disclosure.
Figure 13:
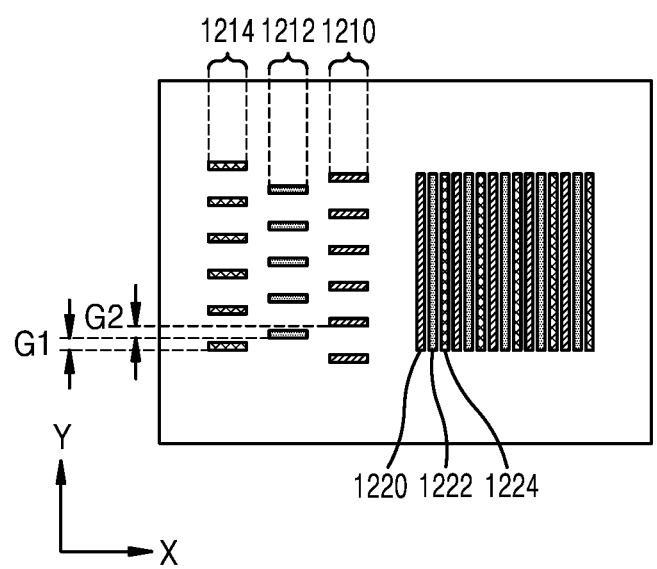

As another example, when the first diffractive elements 1120, 1122, and 1124 of the respective layers 1110, 1112, and 1114 are configured as the pattern of the plurality of first diffractive elements 620 of the second embodiment in FIG. 6 or the plurality of first diffractive elements 720 of the third embodiment in FIG. 7, the first diffractive elements 1120, 1122, and 1124 of the respective layers 1110, 1112, and 1114 may be arranged apart from each other at predetermined intervals in the y-axis direction in order not to overlap each other on the x-y plane as shown in FIGS. 12 and 13.

An image generator 1150 outputs collimated image beams to the first diffractive elements 1120, 1122, and 1124 of the respective layers 1110, 1112, and 1114. In this embodiment, a case of that the image generator 1150 respectively outputs the image beams for the respective layers 1110, 1112, and 1114 is illustrated, but the present disclosure is not limited thereto. Another embodiment in which the image generator 1150 outputs beams to the first diffractive elements of each layer is shown in FIG. 26. The image generator 1150 generates a shift image of each layer incident on the pupil for rendering a depth. A method of generating the shift image will be described with reference to FIGS. 24 to 27.

FIGS. 12 and 13 are views showing a sixth embodiment of an image display optical apparatus according to the present disclosure.

Referring to FIGS. 12 and 13, respective patterns of the diffractive elements of respective layers 1200, 1202, and 1204 of the image display optical apparatus are identical to those of FIG. 6. However, the first diffractive elements 1210, 1212, and 1214 and the second diffractive elements 1220, 1222, and 1224 of the respective layers 1200, 1202, and 1204 are arranged without overlapping each other on the x-y plane. The respective patterns of the diffractive elements of the respective layers shown in FIG. 12 are projected onto the x-y plane and are illustrated together in FIG. 13.

Intervals G1 and G2 between the first diffractive elements 1210, 1212, and 1214 located on different layers 1200, 1202, and 1204 of a substrate may be set to be an interval obtained by equally dividing an interval E between the first diffractive elements located on a same layer of the substrate. For example, when the interval E between the first diffractive elements of each of the layers is 4 mm that corresponds to the diameter of the pupil, the interval G1 between the first diffractive element 1210 of first layer 1200 and the first diffractive element 1212 of second layer 1202 may be implemented as about 1.3 mm, and the interval G2 between the second diffractive element 1212 of the second layer 1202 and the second diffractive element 1214 of third layer 1204 may be implemented as about 1.3 mm. The intervals G1 and G2 between the first diffractive elements 1210, 1212, and 1214 of the respective layers 1200, 1202, and 1204 may be modified variously according to one or more embodiments.

FIGS. 14 and 15 are views showing a seventh embodiment of an image display optical apparatus according to the present disclosure.

Referring to FIGS. 14 and 15, respective patterns of the diffractive elements of respective layers 1400, 1402, and 1404 of the image display optical apparatus are identical to those of FIG. 9. However, the first diffractive elements 1410, 1412, and 1414, the second diffractive elements 1430, 1432, and 1434, and the third diffractive elements 1420, 1422, and 1424 of the respective layers 1400, 1402, and 1404 are all arranged without overlapping each other on the x-y plane. The respective patterns of the diffractive elements of the respective layers are projected onto the x-y plane and are illustrated together in FIG. 15.

Intervals of the second diffractive elements 1430, 1432, or 1434 and those of the third diffractive elements 1420, 1422, or 1424 located on a same layer of a substrate, and intervals of the second diffractive elements 1430, 1432, and 1434 and those of the three diffractive elements 1420, 1422, and 1424 located on different layers of the substrate, may be set in the same manner as those described in the embodiments set forth above.

FIG. 16 is a view showing an example of output patterns of beamlets shown in the fifth to seventh embodiments illustrated in FIGS. 11 to 15.

Referring to FIG. 16, the output patterns of the beam lets output from second diffractive elements of respective layers of the fifth to seventh embodiments are arranged at predetermined intervals.

For example, when patterns of the diffractive elements of each layer are patterns of the diffractive elements of the second embodiment in FIG. 6 or those of the third embodiment in FIG. 7, first diffractive elements of different layers are arranged at predetermined intervals G1 and G2 along the y-axis direction on the x-y plane, and second diffractive elements of different layers are arranged at predetermined intervals F1 and F2 along the x-axis direction on the x-y plane, the output patterns of the beamlets 1600, 1610, and 1620 of the respective layers are arranged at the predetermined intervals F1, F2, G1, and G2 in the x-axis and the y-axis directions.

In another example, when patterns of the diffractive elements of each layer are patterns of the diffractive elements of the fourth embodiment in FIG. 9, third diffractive elements of the different layers are arranged at the predetermined intervals G1 and G2 along the y-axis direction on the x-y plane, and the second diffractive elements of the different layers are arranged at the predetermined intervals F1 and F2 along the x-axis direction on the x-y plane, the output patterns of the beam lets 1600, 1610, and 1620 of the respective layers are arranged at the predetermined intervals F1, F2, G1, and G2 in the x-axis and the y-axis directions.

When intervals A and E between respective diffractive elements located on a same layer of a substrate are less than the diameter of the pupil, for respective angle of views, zero to one of the beamlets 1600, 1610, and 1620 from each layer are respectively incident on a pupil 1650. That is, zero to one of the beam let 1600 of first layer, zero to one of the beamlet 1610 of second layer, and zero to one of the beamlet 1620 of third layer are respectively incident on the pupil 1650. Accordingly, as shown in FIG. 17, images may be formed on the retina by using two to three of the beamlets 1600, 1610, and 1620, and thereby rendering a depth.

Figure 17:
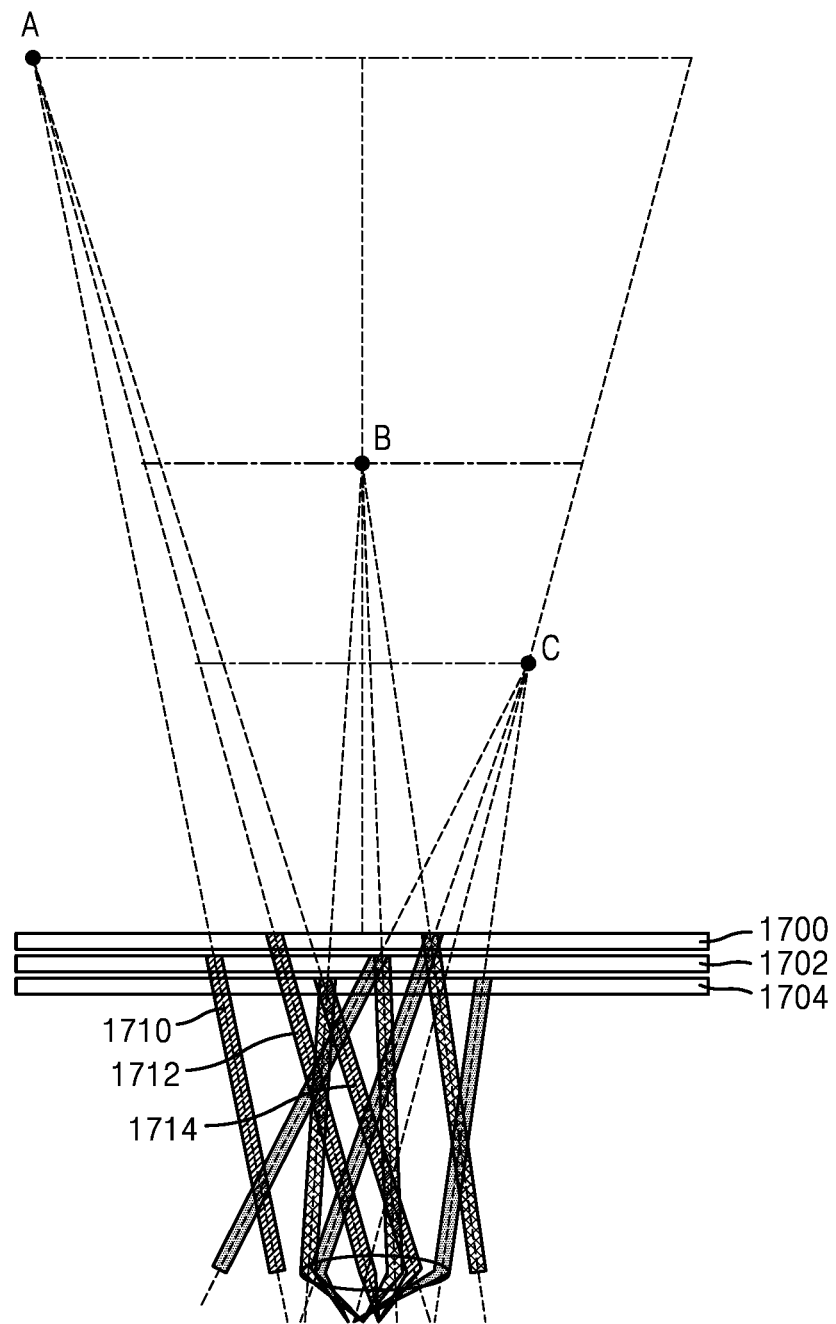
FIG. 17 is a view illustrating a concept of rendering a depth by using multiple layers, according to one or more embodiments of the present disclosure.

FIG. 17 is a view illustrating a concept of rendering a depth by using multiple layers, according to one or more embodiments of the present disclosure.

Referring to FIG. 17, beamlets output by a plurality of second diffractive elements located on respective layers 1700, 1702, and 1704 may form various virtual object points, e.g., A, B, and C. For example, each of the beamlets 1710, 1712, and 1714 output from the respective layers 1700, 1702, and 1704 may generate the virtual object point A. When eye focus is adjusted to the virtual object point A, since each of the beamlets 1710, 1712, and 1714 output from three layers 1700, 1702, and 1704 is incident on the pupil and thereby forming a focus on the retina, a user may clearly see an object of the virtual object point A. Even though the beam lets for other virtual object points such as B and C etc.

are incident on the pupil, a focus on the retina may not be formed, and thereby appeared to be blurry to the user.

For example, beamlets output from the respective layers 1700, 1702, 1704 parallel onto the pupil may converge on the retina when the eye focus is infinity focus. However, beamlets that are divergent from the respective layers 1700, 1702, and 1704 with a certain angle and incident on the pupil may not converge on the retina when the eye focus is infinity focus. In this case, when the eye focus is adjusted to a virtual object point, e.g., A, B, and C, of the beam lets divergent with the certain angle and incident on the pupil, the beamlets may converge on the retina. Beamlets divergent with other angles may not form a focus on the retina, and thereby appeared to be blurry.

Accordingly, the image display optical apparatus may output to the pupil the beamlets 1710, 1712, and 1714 of a certain angle based on the focal length of the eye and may render the depth of an image. For example, the image display optical apparatus may render a depth of 10 cm by outputting to the pupil beamlets that diverges about plus or minus 1 degree relative to beamlets that passes through the center of the pupil.

Figure 18:
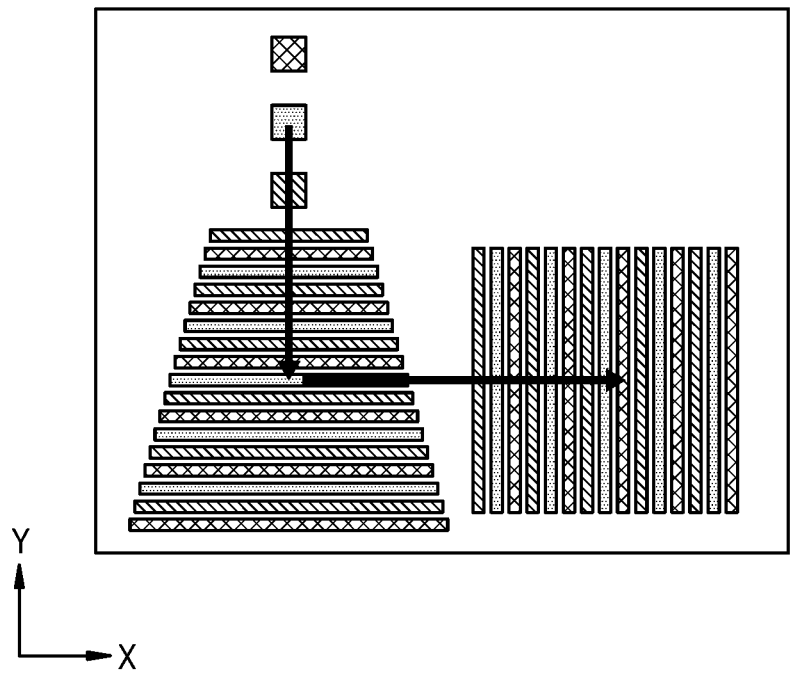
FIGS. 18 and 19 are views respectively showing eighth and ninth embodiments of an image display optical apparatus according to the present disclosure.
Figure 19:
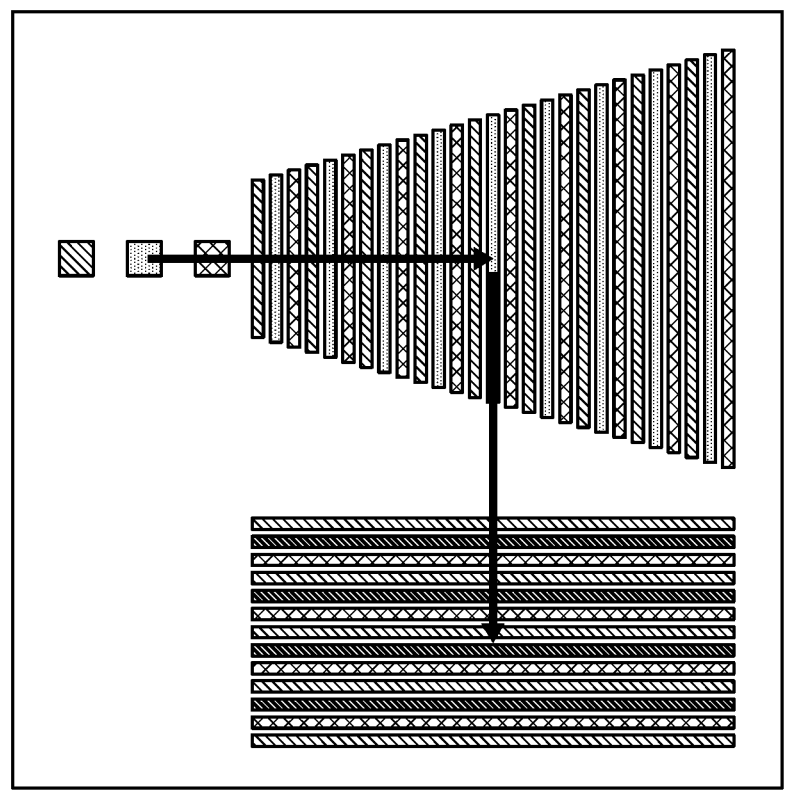

FIGS. 18 and 19 are views respectively showing eighth and ninth embodiments of an image display optical apparatus according to the present disclosure.

FIGS. 18 and 19 are views illustrating projections of a plurality of diffractive elements arranged in each layer on the same x-y plane. The eighth and the ninth embodiments are examples in which the seventh embodiment of FIGS. 14 and 15 is respectively implemented with respect to different directions.

Figure 20:
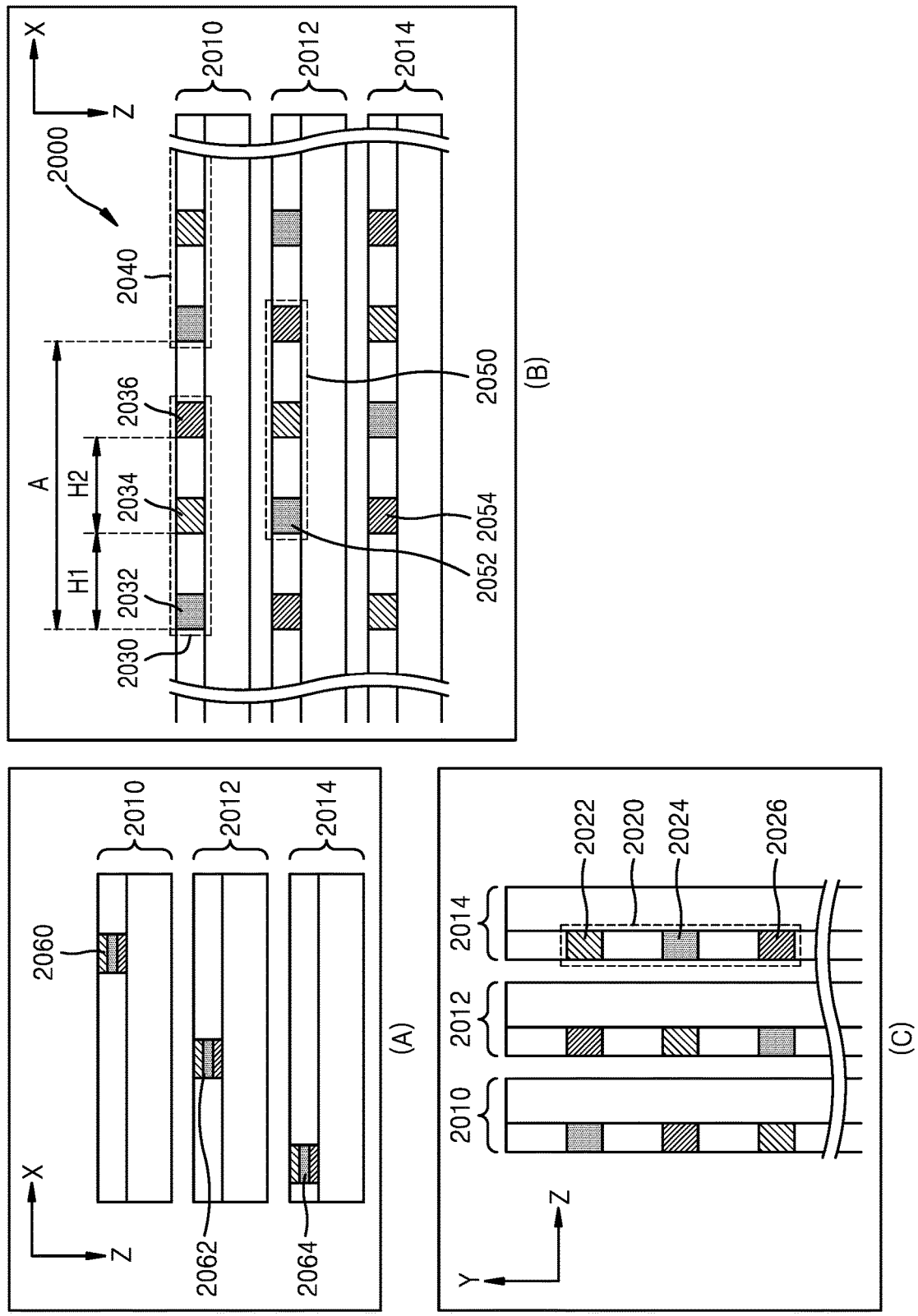
FIG. 20 is a view showing a tenth embodiment of an image display optical apparatus according to the present disclosure.

FIG. 20 is a view showing a tenth embodiment of an image display optical apparatus according to the present disclosure.

Referring to FIG. 20, an XZ sectional view A of first diffractive elements, an XZ sectional view B of second diffractive elements, and a YZ sectional view C of third diffractive elements are shown. While the present embodiment of displaying color images by the image display optical apparatus is configured into the multiple layers and third diffractive elements such as the seventh embodiment shown in FIGS. 14 and 15, but the present embodiment is not limited thereto and may be applied to at least one of the first to ninth embodiments.

Referring to (B) of FIG. 20, the second diffractive elements 2030, 2040, and 2050 of respective layers 2010, 2012, and 2014 are configured to include a first sub-diffractive element 2032, a second sub-diffractive element 2034, and a third sub-diffractive element 2036 that respectively diffract and output red light, green light, and blue light where red light, green light and blue light are guided through a substrate. For example, the first to third sub-diffractive elements 2032, 2034, and 2036 may be implemented as VHG such that the first sub-diffractive element 2032 may diffract only a wavelength of red light, the second sub-diffractive element 2034 may diffract only a wavelength of green light and the third sub-diffractive element 2036 may diffract only a wavelength of blue light.

An Interval A between the second diffractive elements 2030 and 2040 arranged on a same layer of the substrate is identical to that of the first to ninth embodiments. Intervals H1 and H2 between a plurality of sub-diffractive elements 2032, 2034, and 2036 within each of the second diffractive elements 2030, 2040, and 2050 may be set variously according to one or more embodiments, but the intervals H1 and H2 may be an interval obtained by equally dividing the interval A of the second diffractive elements to cause output beamlets of each of the sub-diffractive elements to be incident to the pupil at predetermined intervals. For example, when the interval A between the second diffractive elements 2030 and 2040 is 4 mm, the interval H1 between the first sub-diffractive element 2032 and the second sub-diffractive element 2034 may be 1.3 mm, and the interval H2 between the second sub-diffractive element 2034 and the third sub-diffractive element 2036 may be 1.3 mm.

The second diffractive elements 2030 and 2050 located on different layers of the substrate may be arranged apart from each other at predetermined intervals F1 and F2 in the x-axis direction as those shown in the first to ninth embodiments. In this case, a position of the second sub-diffractive element 2034 of first layer 2010 and that of the first sub-diffractive element 2052 of second layer 2012 may be all (when F1=H1 and F2=H2) or partially overlapped with each other in the x-axis. Herein, types of the sub-diffractive elements overlapped with each other in the respective layers are different from each other. For example, the second sub-diffractive element 2034 of the first layer 2010, the first sub-diffractive element 2052 of the second layer 2012, and the third sub-diffractive element 2054 of third layer 2014 are arranged in an overlapping manner.

Referring to (C) of FIG. 20, a third diffractive element 2020 of the respective layers 2010, 2012, and 2014 may be configured to include a fourth sub-diffractive element 2022, a fifth sub-diffractive element 2024, and a sixth sub-diffractive element 2026, where the fourth sub-diffractive element 2022, the fifth sub-diffractive element 2024, and the sixth sub-diffractive element 2026 are respectively diffract red light, green light, and blue light.

An interval between third diffractive elements arranged on a same layer of the substrate may be identical to that of the fourth to ninth embodiments. Intervals between the fourth to sixth sub-diffractive elements 2022, 2024, and 2026 on a same layer of the substrate may be set variously according to one or more embodiments, and as an example, the intervals between the fourth to sixth sub-diffractive elements 2022, 2024, and 2026 of the third diffractive element 2020 of the respective layers may be set to be identical to the intervals H1 and H2.

Intervals between multiple sub-diffractive elements within each third diffractive element 2020 may be set variously according to one or more embodiments, but the multiple sub-diffractive elements within each third diffractive element 2020 may be arranged at an interval obtained by equally dividing the interval of the third diffractive element 2020 in order to cause output beamlets of respective sub-diffractive elements to be incident to the pupil at predetermined intervals. For example, when an interval between the third diffractive elements 2020 is 4 mm, an interval between the fourth sub-diffractive element 2022 and the fifth sub-diffractive element 2024 may be 1.3 mm, and an interval between the fifth sub-diffractive element 2024 and the sixth sub-diffractive element 2026 may be 1.3 mm.

The third diffractive element 2020 located on different layers of the substrate may be arranged apart from each other at predetermined intervals in the y-axis direction as the fourth to ninth embodiments. In this case, a position of a fifth sub-diffractive element of first layer 2010 and that of a fourth sub-diffractive element of second layer 2012 may be all or partially overlapped with each other in the y-axis. Herein, types of the sub-diffractive elements overlapped with each other in the respective layers are different from each other. For example, the fifth sub-diffractive element of the first layer 2010, the fourth sub-diffractive element of the second layer 2012, and a sixth sub-diffractive element of third layer 2014 are arranged in an overlapping manner.

Referring to (A) of FIG. 20, first diffractive elements 2060, 2062, and 2064 of the respective layers 2010, 2012, and 2014 may be formed by a structure for respectively separating red light, green light, and blue light from the incident beams and outputting red light, green light, and blue light. For example, the first diffractive elements 2060, 2062, and 2064 may be implemented by a structure used for wavelength-multiplexing of red light, green light, and blue light included in the incident beams or by a laminated structure of sub-diffractive elements outputting red light, green light, and blue light.

The present embodiment shows a case including the third diffractive element, but the present disclosure is not limited thereto, and the present embodiment may be implemented in the image display optical apparatus with a multi-layer structure without the third diffractive element, e.g., the fifth embodiment of FIG. 11. That is, in the fifth embodiment, the first diffractive elements 1120, 1122, and 1124 of the respective layers 1110, 1112, and 1114 may be implemented by a structure used for wavelength multiplexing or by a laminated structure of sub-diffractive elements, the second diffractive elements 1130, 1132, and 1134 of the respective layers 1110, 1112, and 1114 may be implemented by the first to third sub-diffractive elements 2032, 2034, and 2036 that respectively diffract and output red light, green light and blue light that are separated and guided by the first diffractive elements 1120, 1122, and 1124.

In another embodiment, a color display method of the present embodiment may be applied to an image display optical apparatus with single-layer structure, e.g., the first embodiment of FIG. 2, the second embodiment of FIG. 6, and the third embodiment of FIG. 7. For example, in the first, the second, and the third embodiments, first diffractive elements 210, 620, and 720 may be implemented by a structure used for wavelength-multiplexing or by a laminated structure of sub-diffractive elements, and second diffractive elements 220, 230, 240, 630 and 730 may be implemented by the first to third sub-diffractive elements 2032, 2034 and 2036 that respectively diffract and output red light, green light, and blue light that are separated and guided by the first diffractive elements 210, 620, and 720.

In another embodiment, the color display method of the present embodiment may be applied to an image display optical apparatus with a single-layer structure including third diffractive elements, e.g., the fourth embodiment of FIG. 9. For example, in the fourth embodiment, the first diffractive element 920 may be implemented by a structure used for wavelength-multiplexing or a laminated structure of sub-diffractive elements, and each of the plurality of third diffractive elements 930 may be implemented by the fourth to sixth sub-diffractive elements 2022, 2024, and 2026 that respectively diffract red light, green light, and blue light that are separated and guided by the first diffractive element 920, and each of the plurality of second diffractive elements 940 may be implemented by the first to third sub-diffractive elements 2032, 2034, and 2036 that are respectively diffract and output red light, green light, and blue light that are respectively diffracted and guided by respective sub-diffractive elements 2022, 2024, and 2026 of the plurality of third diffractive elements 930.

Figure 21:
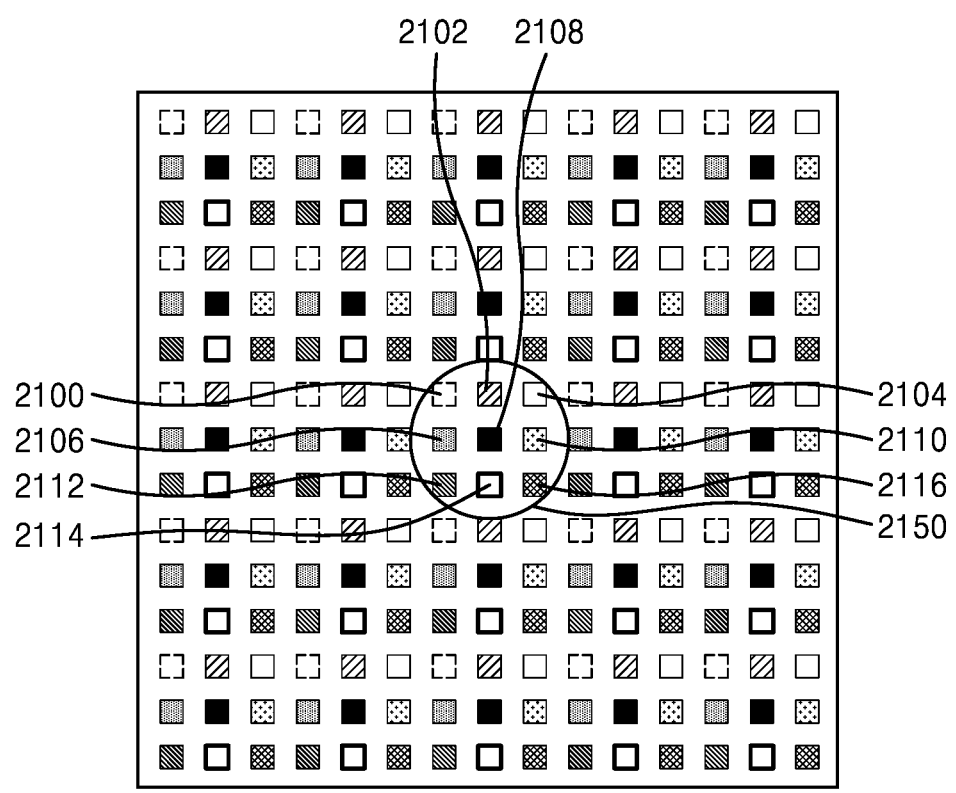
FIG. 21 is a view showing an example of output patterns of beamlets shown in the tenth embodiment in FIG. 20.

FIG. 21 is a view showing an example of output patterns of beamlets shown in the tenth embodiment in FIG. 20.

Referring to FIG. 21, a beamlet of red light 2100, a beamlet of green light 2104, and a beamlet of blue light 2102 that are respectively output from the first to third sub-diffractive elements 2032, 2034, and 2036 of the second diffractive element 2030 located on any one of the layers 2010, 2012, and 2014 are arranged at intervals between the first to third sub-diffractive elements 2023, 2034, and 2036 in the x-axis direction and at intervals between the fourth to sixth sub-diffractive elements 2022, 2024, and 2026 in the y-axis direction.

Beamlets of red light 2100, 2108, and 2116, beamlets of green light 2104, 2106, and 2114, and beamlets of blue light 2102, 2110, and 2112 where the beamlets of red light 2100, 2108, and 2116, the beamlets of green light 2104, 2106, and 2114, and the beamlets of blue light 2102, 2110, and 2112 are output from different layers, are respectively arranged at predetermined intervals in the x-axis and the y-axis directions based on intervals F1 and F2 between second diffractive elements of each layer and intervals G1 and G2 between third diffractive elements of each layer.

Figure 22:
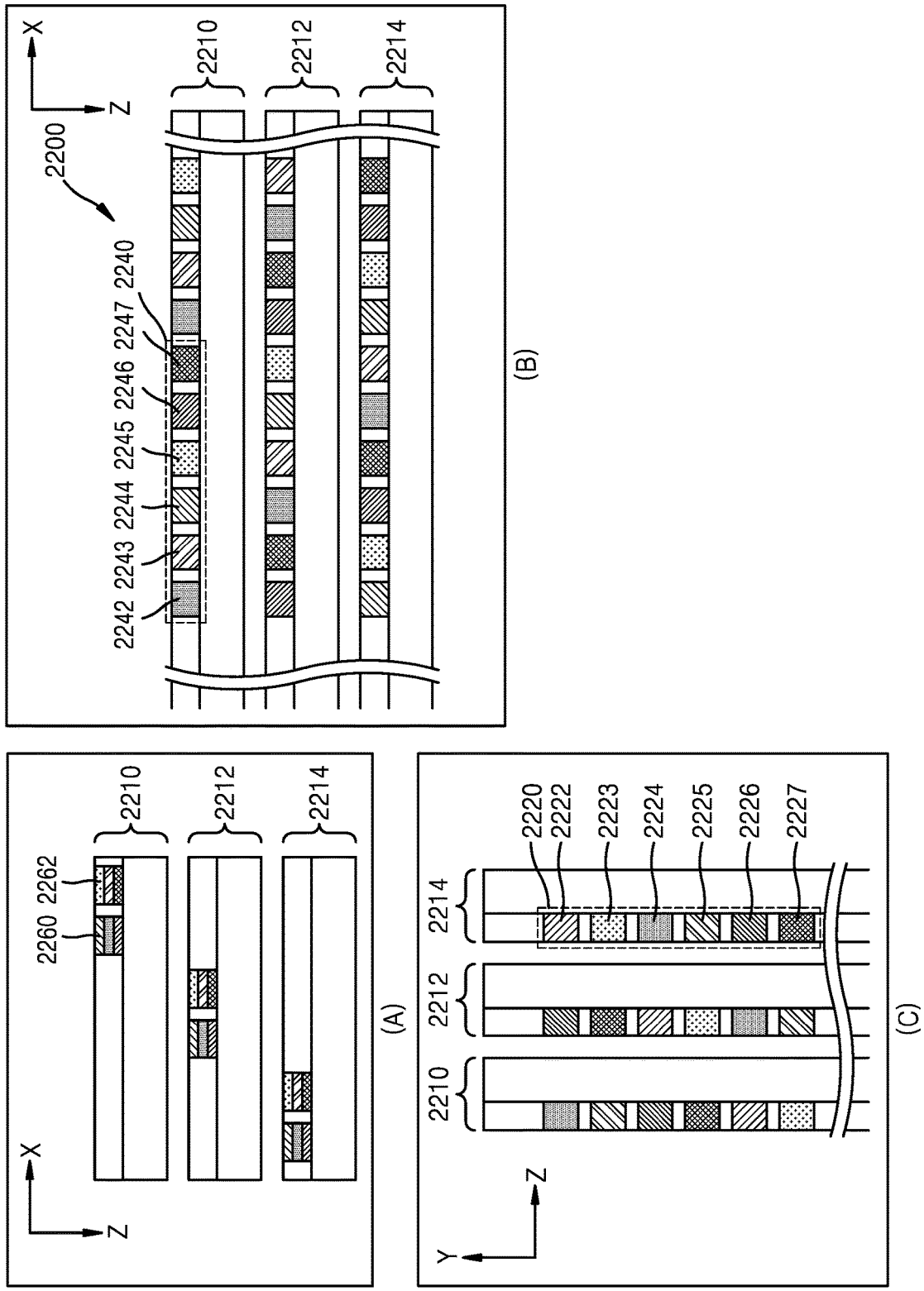
FIG. 22 is a view showing an eleventh embodiment of an image display optical apparatus according to the present disclosure.
Figure 23:
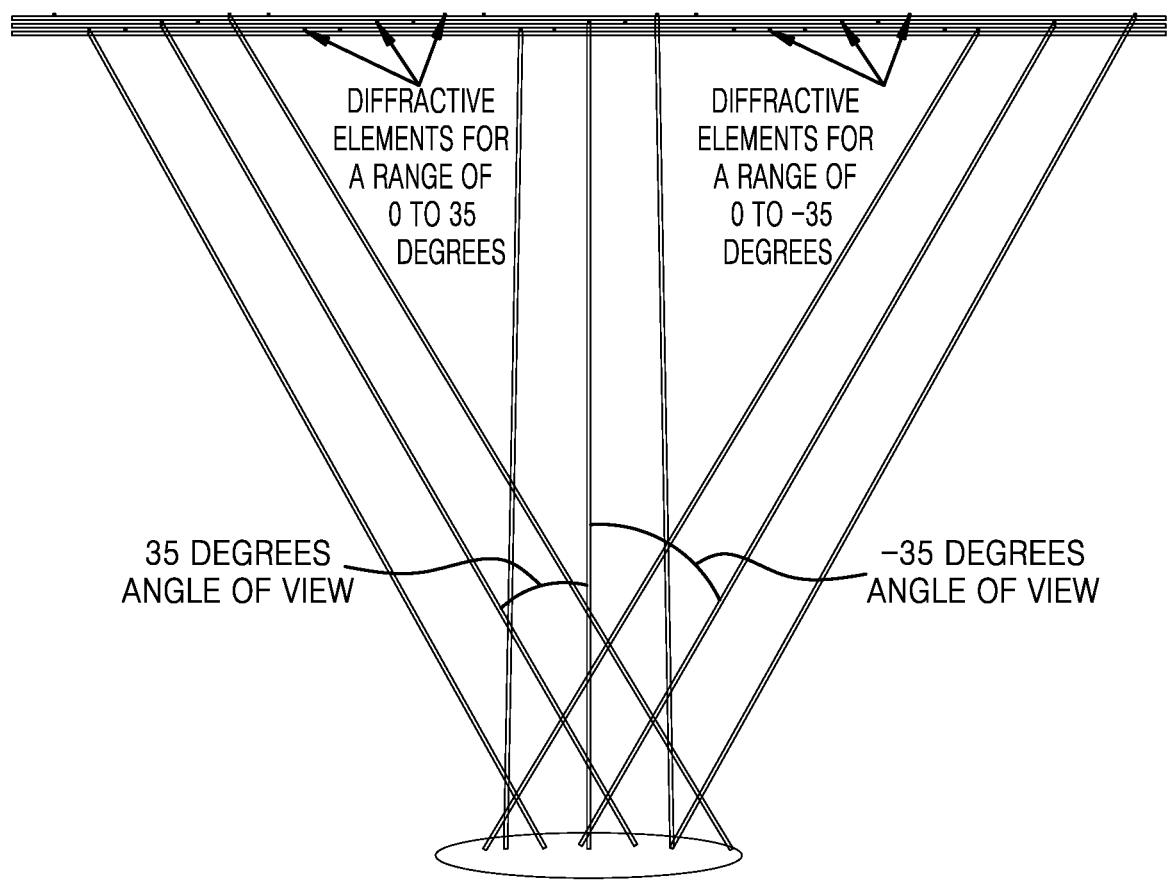
FIG. 23 is a view showing an example of increasing an angle of view according to the eleventh embodiment in FIG. 22.

FIG. 22 is a view showing an eleventh embodiment of an image display optical apparatus according to the present disclosure. FIG. 23 is a view showing an example of increasing an angle of view according to the eleventh embodiment of FIG. 22.

Referring to FIG. 22, an XZ sectional view (A) of first diffractive elements, an XZ sectional view (B) of second diffractive elements, and a YZ sectional view (C) of third diffractive elements are shown. An example in which a method of increasing the angle of view is applied to the color display method of the tenth embodiment of FIG. 20 is shown.

Referring to (B) of FIG. 22, second diffractive element 2240 of respective layers 2210, 2212, and 2214 may include a first sub-diffractive element 2242, a second sub-diffractive element 2244 and a third sub-diffractive element 2246 which respectively diffract in a first diffraction range, e.g., 0 to 35 degrees, and output red light, green light, and blue light and may include a fourth sub-diffractive element 2243, a fifth sub-diffractive element 2245, and a sixth sub-diffractive element 2247 which diffract in a second diffraction range, e.g., −35 to 0 degrees, and output red light, green light, and blue light. According to one or more embodiments, a portion of the first diffraction range and the second diffraction range may overlap each other. The first to sixth sub-diffractive elements are arranged alternately.

For example, in the tenth embodiment of FIG. 20, the first to third sub-diffractive elements 2032, 2034, and 2036 may be implemented with the first diffraction range, and the fourth to sixth sub-diffractive elements 2243, 2245, and 2247 having the second diffraction range may be implemented by respectively arranging them between the first to third sub-diffractive elements 2032, 2034, and 2036.

Referring to (C) of FIG. 22, third diffractive element 2220 may also include seventh, eighth, and ninth sub-diffractive elements 2222, 2224, and 2226 that respectively diffract red light, green light, and blue light in the first diffraction range and tenth, eleventh, and twelfth sub-diffractive elements 2223, 2225, and 2227 that respectively diffract red light, green light and blue light in the second diffraction range. The seventh to twelfth sub-diffractive elements 2222, 2223, 2224, 2225, 2226, and 2227 are arranged alternately.

For example, in the tenth embodiment of FIG. 20, the fourth to sixth sub-diffractive elements 2022, 2024, and 2026 may be implemented with the first diffraction range, and the tenth to twelfth sub-diffractive elements 2223, 2225 and 2227 having the second diffraction range may be implemented by respectively arranging them between the fourth to sixth sub-diffractive elements 2022, 2024, and 2026.

Referring to (A) of FIG. 22, first diffractive element of the respective layers 2210, 2212, and 2214 may include a thirteenth diffractive element 2260 of the first diffraction range and a fourteenth sub-diffractive element 2262 of the second diffraction range in order to cause beams with a certain angle to be incident to the third diffractive element. The thirteenth and fourteenth sub-diffractive elements 2260 and 2262 separate and output red light, green light, and blue light in the same manner as in the embodiment of FIG. 20.

The present embodiment shows a case including the third diffractive element, but the present disclosure is not limited thereto, and the present embodiment may be implemented in the image display optical apparatus with a multi-layer structure without the third diffractive element, e.g., the fifth embodiment of FIG. 11. That is, in the fifth embodiment, each of the first diffractive elements 1120, 1122, and 1124 of the respective layers 1110, 1112, and 1114 may be implemented by the thirteenth and the fourteenth sub-diffractive elements 2260 and 2262, and each of the second diffractive elements 1130, 1132, and 1134 of the respective layers 1110, 1112, and 1114 may be implemented by the first to sixth sub-diffractive elements 2242, 2243, 2244, 2245, 2246, and 2247.

In another embodiment, the method of increasing the angle of view of the present embodiment may be applied to an image display apparatus with a single-layered structure, e.g., the first embodiment of FIG. 2, the second embodiment of FIG. 6, and the third embodiment of FIG. 7. For example, in the first, the second, and the third embodiments, the first diffractive elements 210, 620, and 720 may be implemented by the thirteenth and the fourteenth sub-diffractive elements 2260 and 2262, and each of the second diffractive elements 220, 230, 240, 630 and 730 may be implemented by the first to sixth sub-diffractive elements 2242, 2243, 2244, 2245, 2246, and 2247.

As another example, the method of increasing the angle of view of the present embodiment may be applied to an image display optical apparatus with a single-layer structure including third diffractive element, e.g., the fourth embodiment of FIG. 9. For example, in the fourth embodiment, the first diffractive element 920 may be implemented by the thirteenth and the fourteenth sub-diffractive elements 2260 and 2262, each of the plurality of third diffractive elements 930 may be embodied as the seventh to twelfth sub-diffractive elements 2222, 2223, 2224, 2225, 2226, and 2227 that respectively diffract red light, green light and blue light that are separated and guided by the first diffractive element 920, and each of the plurality of second diffractive elements 940 may be implemented by the first to sixth sub-diffractive elements 2242, 2243, 2244, 2245, 2246, and 2247 that respectively diffract and output red light, green light, and blue light that are diffracted by respective sub-diffractive elements 2222, 2223, 2224, 2225, 2226, and 2227 of the plurality of third diffractive elements 930.

As another example, the method of increasing the angle of view of the present embodiment may be applied to the first to ninth embodiments except for the color display method. For example, in the first to ninth embodiments, a first diffractive element may be implemented by two sub-diffractive elements having the first diffraction range and the second diffraction range, and each second diffractive element may be implemented with two sub-diffractive elements having the first diffraction range and the second diffraction range. In an embodiment including third diffractive elements, the third diffractive elements may also be implemented by two sub-diffractive elements having the first diffraction range and the second diffraction range.

Figure 24:
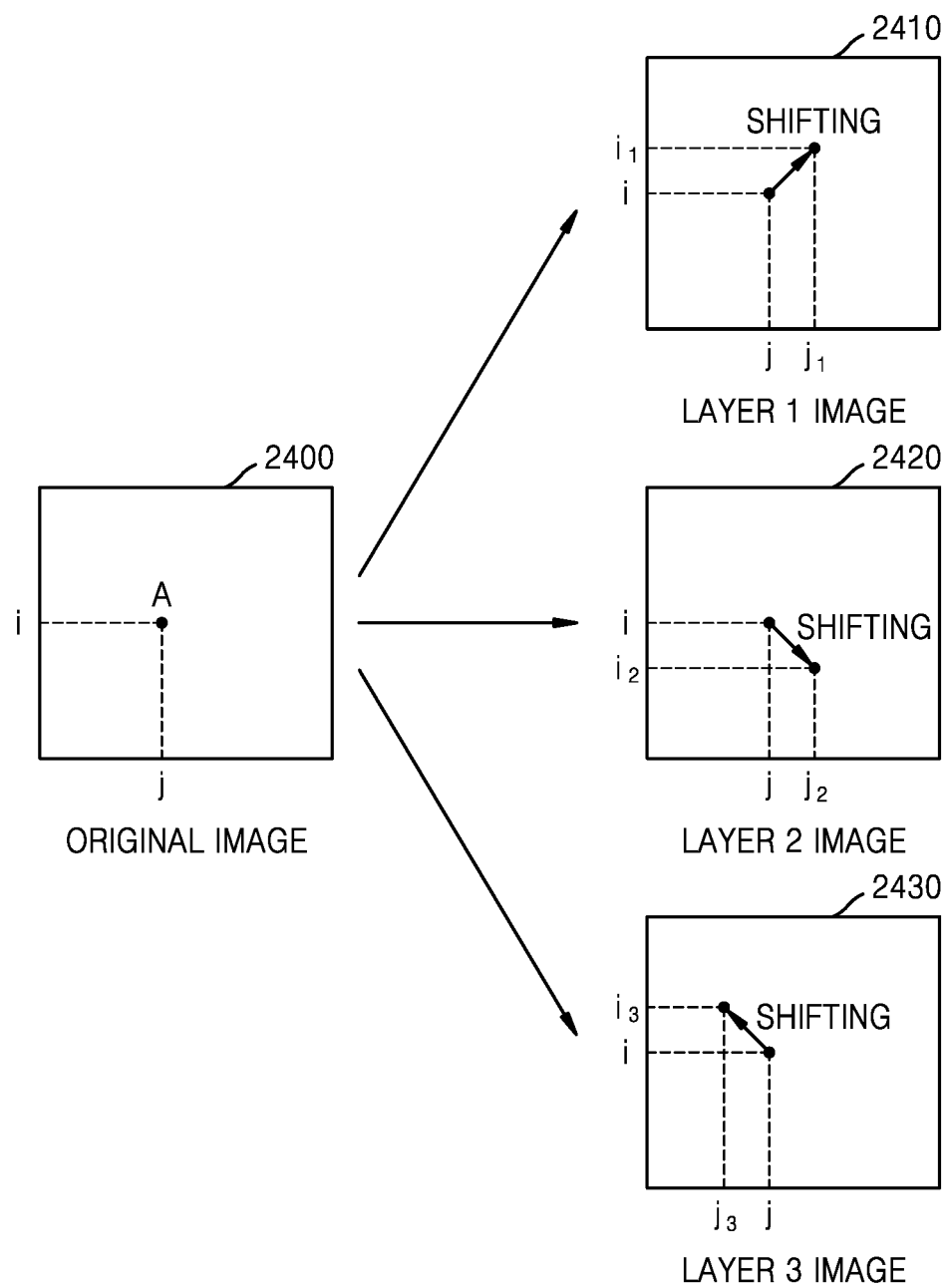
FIG. 24 is a view showing a concept of images incident on each layer of an image display optical apparatus according to one or more embodiments of the present disclosure.

FIG. 24 is a view showing a concept of images incident on each layer of an image display optical apparatus according to one or more embodiments of the present disclosure.

Referring to FIG. 24, the images incident on each layer of the image display optical apparatus may be different from each other. Images 2410, 2420, and 2430 input to each layer are images obtained by using depth information of each pixel of an original image 2400 based on a beamlet location on the pupil for each layer. Images generated by shifting pixels of the original image 2400 and input to each layer are referred to as shift images 2410, 2420, and 2430.

Figure 25:
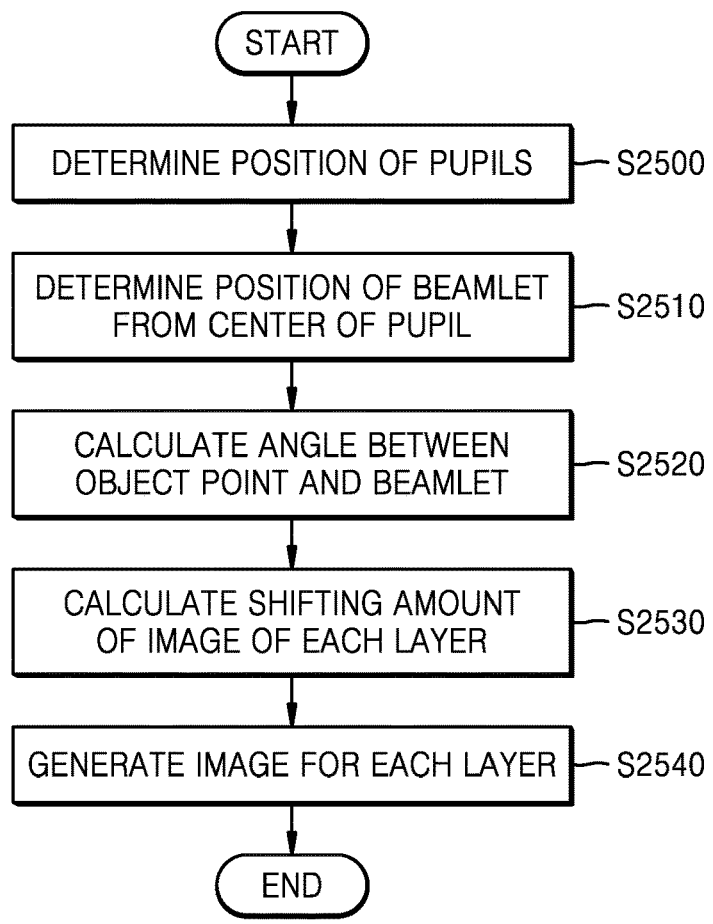
FIG. 25 is a flowchart illustrating an example of an image generating method for an image display optical apparatus according to one or more embodiments of the present disclosure.
Figure 26:
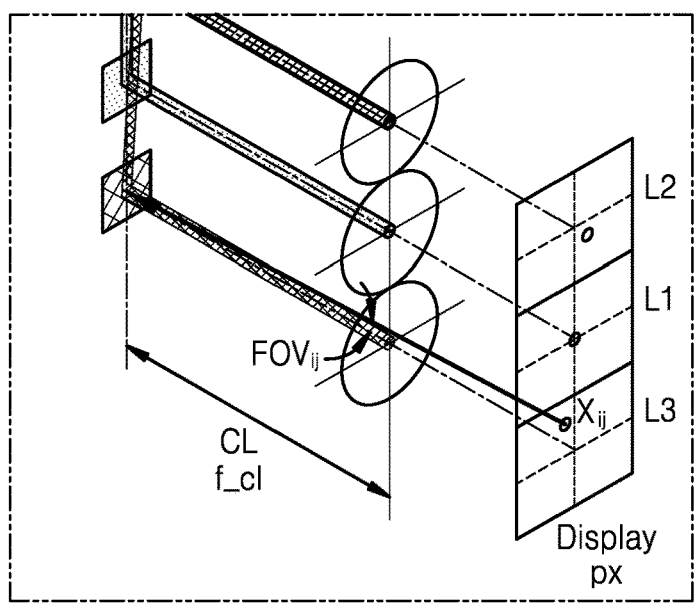
FIGS. 26 and 27 are views showing various parameters used for generating an image.
Figure 27:
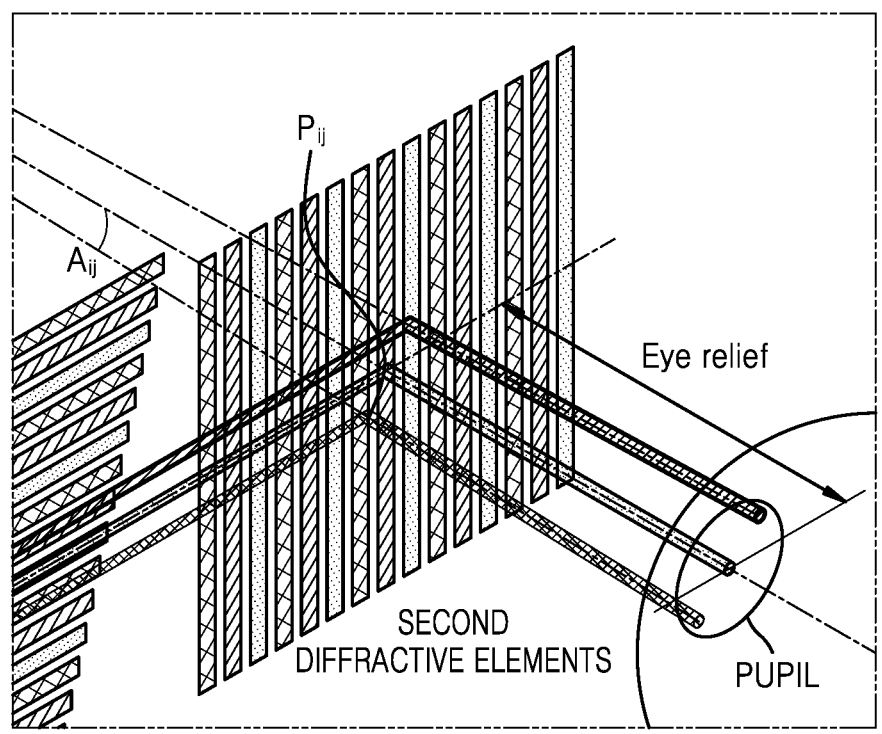

FIG. 25 is a flowchart illustrating an example of an image generating method for an image display optical apparatus according to one or more embodiments of the present disclosure. FIGS. 26 and 27 are views showing various parameters used for generating an image.

Referring to FIGS. 25 to 27, an image generator determines a position of the pupil at operation S2500. Various existing methods of determining a position of the pupil may be applied to the present embodiment. An existing device for determining a position of the pupil may be included, and in this case, the image generator may receive real-time information on the position of the pupil, e.g., the position of the center of the pupil, from the existing device that determines a position of the pupil.

The image generator determines a position of a beam let of each layer that is incident on the pupil at operation S2510. Output patterns of beamlets of each angle of view output from second diffractive elements are shown as in FIGS. 4, 8, 16, and 21 according to respective embodiments. For convenience of description, the present embodiment will be described mainly with reference to an image display optical apparatus that is implemented by a plurality of layers as shown in FIGS. 14 and 15 and generates patterns as shown in FIG. 16.

Referring to FIG. 26, given a focal length f_cl between first diffractive element and lens of the image generator and a size px of each pixel of an original image, incident angle $FOV_{ij}$ at which a pixel $x_{ij}$ incident on each layer is incident to first diffractive element of a corresponding layer may be obtained. For example, the incident angle $FOV_{ij}$ at which the pixel $x_{ij}$ is incident to first diffractive element for each layer may be obtained by equation described in the following. An angle at which a pixel is incident to each layer may all be the same.

$$FOV_{ij} = \tan^{-1}\left(\frac{x_{ij} * px}{f\_cl}\right) \qquad \text{[Equation 1]}$$

The pixel $x_{ij}$ incident to first diffractive element of each layer at first incident angle $FOV_{ij}$ is output by second diffractive elements of each layer. Referring to FIG. 27, a position of the pixel $x_{ij}$ on the x-y plane where the pupil is located is determined based on incident angle, parameter of each diffractive element, and eye relief. Accordingly, an output position $P_{Lij}$ of a beam let of each layer outputting a particular pixel $x_{ij}$ and incident on the pupil may be determined by function described in the following. The image generator determines the output position $P_{Lij}$ on the pupil of the beamlet corresponding to each pixel by using the function that is predetermined as Equation 2 at operation S2510.

$$P_{Lij} = \text{mod}(eye\_relief * \tan(FOV_{ij}), \text{pupil size}) \qquad \text{[Equation 2]}$$

Herein, mod (a, b) refers to the remainder obtained by dividing a with b.

The image generator calculates output angle $A_{Lij}$ of the beam let at the output position $P_{Lij}$ of each layer by using depth information $D_{ij}$ of the pixel $x_{ij}$ stored in advance and the original image at operation S2520. For example, referring to FIG. 27, the image generator determines the output angle $A_{Lij}$ formed by a line connecting the center of the pupil and a virtual object point determined by using the depth information $D_{ij}$ of the pixel $x_{ij}$ and a line connecting the virtual object point and the output position $P_{Lij}$ of the beamlet. This may be expressed as equation described in the following.

$$A_{Lij} = \tan^{-1}\left(\frac{P_{Lij}}{D_{ij}}\right) \quad \text{[Equation 3]}$$

At operation S2530, the image generator calculates shifting amount $S_{Lij}$ of a pixel of each layer by dividing output angle $A_{Lij}$ of each output position $P_{Lij}$ by an angle, e.g., tan-1 (px/f_cl), generated by one pixel. A method of calculating the shifting amount $S_{Lij}$ is expressed as equation described in the following.

$$S_{Lij} = \frac{A_{Lij}}{\tan^{-1}(px/f\_cl)} \quad \text{[Equation 4]}$$

The image generator generates a shift image of each layer by shifting each pixel of the original image based on a shifting amount of each pixel at operation S2540.

Figure 28:
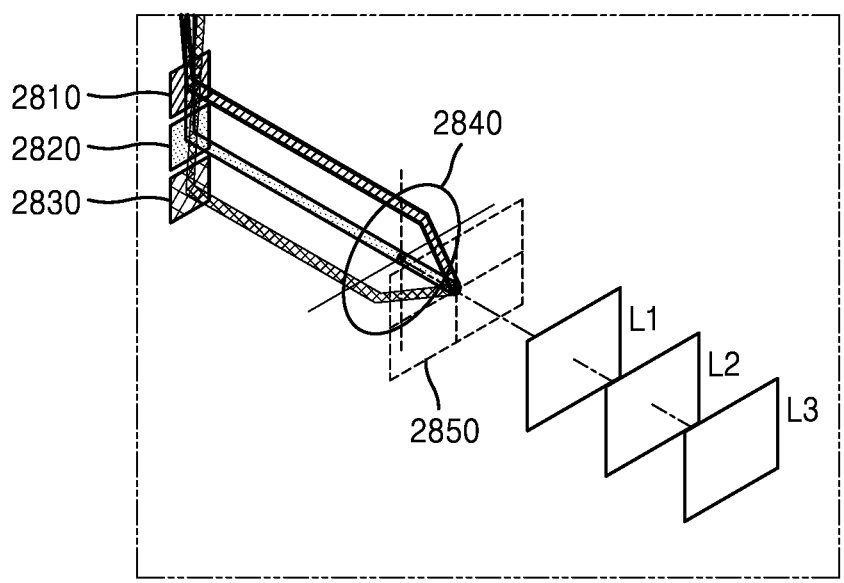
FIG. 28 is a view illustrating an image output method of an image generator according to one or more embodiments of the present disclosure.

FIG. 28 is a view illustrating an image output method of an image generator according to one or more embodiments of the present disclosure.

Referring to FIG. 28, the image generator may output the shift image of each layer to the first diffractive element of each layer at the same time, but the present embodiment sequentially outputs shift images L1, L2, and L3 one at a time for each layer.

For example, when displaying an image at 60 Hz, the image generator outputs the shift images L1, L2, and L3 every 1/(60*3) seconds for one layer, 2850. That is, after the shift image L1 of first layer is output, the shift image L2 of second layer is output at a time lapse of 1/180 seconds, and when 1/180 seconds elapse again, the shift image L3 of third layer is output.

Since the shift images output from the image generator are output to all the first diffractive element of each layer through lens 2840, a blocking unit 2810, 2820, or 2830 that blocks an image output from the image generator may be included in front of the first diffractive element of each layer. Blocking units 2810, 2820, and 2830 operate in synchronization with an output sequence of images of the image generator. For example, when the image generator outputs the shift image of the first layer, the blocking unit 2820 of the second layer and the blocking unit 2830 of the third layer block the shift image of the first layer. When the image generator outputs the shift image of the second layer, the blocking unit 2810 of the first layer and the blocking unit 2830 of the third layer block the shift image of the second layer. The blocking unit may be implemented by various display elements that change to be black or transparent according to an electrical signal.

According to the present disclosure, the depth of an object may be rendered in virtual reality or in augmented reality. In addition, one or more embodiments may be implemented in small and light form factors such as glasses. Besides, an optical see-through or video see-through image capable of providing a high-resolution image may be displayed even when the position of the pupil of a user is changeable. Further, by implementing true 3D through rendering the depth of an object, the dizziness caused by the vergence-accomodation conflict may be solved. Also, a real-time generation of an image capable of rendering the depth of an object according to the position of the pupil is feasible.

One or more embodiments according to the present disclosure may be implemented as program codes recorded in computer-readable recording media. The computer-readable recording media include all types of storage devices on which computer-readable data are stored. For example, the computer-readable recording media are read-only memory (ROM), random access memory (RAM), compact disc ROM (CD-ROM), magnetic tape, a floppy disc, an optical data storage device, etc. In addition, the computer-readable recording media may be distributed over computer systems connected by wire or wireless networks, and thus computer-readable program codes may be stored and executed in a distributed manner.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. An optical apparatus comprising:
   a substrate comprising a plurality of layers, each forming an optical waveguide, and comprising, for each layer of the plurality of layers:
   at least one first diffractive element, which is located on one side of the layer and is configured to receive a beam; and
   a plurality of second diffractive elements arranged at predetermined intervals on the layer, wherein the plurality of second diffractive elements are configured to output beams diffracted by the at least one first diffractive element and guided through the substrate;
   wherein the second diffractive elements of identical type located on different layers of the plurality of layers are arranged without overlapping each other.

2. The optical apparatus of claim 1, wherein the plurality of layers of the substrate are arranged as at least three layers.

3. The optical apparatus of claim 2, wherein an interval between the second diffractive elements located on a same layer of the substrate corresponds to a diameter of a pupil, and wherein an interval between the second diffractive elements located on different layers of the substrate is an interval obtained by dividing the diameter of the pupil.

4. The optical apparatus of claim 1, wherein a size of the at least one first diffractive element of each layer of the substrate is equal to or greater than a maximum step length of a beam guided through the substrate or is equal to or less than a size of a beam incident to the at least one first diffractive element.

5. The optical apparatus of claim 1, wherein diffraction ratios of all or a portion of the second diffractive elements located on a same layer of the substrate are different from each other.

6. The optical apparatus of claim 1,
wherein the at least one first diffractive element located on each layer of the substrate is used for wavelength-multiplexing of red light, green light, and blue light included in an incident beam or includes a laminated structure of sub-diffractive elements that output red light, green light, and blue light;
wherein the second diffractive elements located on each layer of the substrate include a first sub-diffractive element, a second sub-diffractive element, and a third sub-diffractive element that respectively output red light, green light, and blue light that are guided through each layer of the substrate; and
wherein sub-diffractive elements of an identical type located on each layer of the substrate are arranged at predetermined intervals, and sub-diffractive elements of the identical type located on different layers of the substrate are arranged without overlapping each other.

7. The optical apparatus of claim 6,
wherein the second diffractive elements located on each layer of the substrate include a fourth sub-diffractive element, a fifth sub-diffractive element, and a sixth sub-diffractive element that respectively output red light, green light, and blue light that are guided through each layer of the substrate;
wherein the first sub-diffractive element, the second sub-diffractive element, and the third sub-diffractive element and the fourth sub-diffractive element, the fifth sub-diffractive element, and the sixth sub-diffractive element are arranged alternately; and
wherein all or a portion of a first diffraction range of the first sub-diffractive element, the second sub-diffractive element, and the third sub-diffractive element is different from a second diffraction range of the fourth sub-diffractive element, the fifth sub-diffractive element, and the sixth sub-diffractive element.

8. The optical apparatus of claim 7, wherein the at least one first diffractive element located on each layer of the substrate includes a seventh sub-diffractive element having the first diffraction range and an eighth sub-diffractive element having the second diffraction range.

9. The optical apparatus of claim 1, further comprising:
a plurality of third diffractive elements arranged at predetermined intervals on each layer of the substrate, further diffracting a beam diffracted and guided by the least one first diffractive element, and transmitting the beam to the second diffractive elements.

10. The optical apparatus of claim 9, wherein all or some of the plurality of third diffractive elements arranged on a same layer of the substrate have different diffraction ratios.

11. The optical apparatus of claim 9, wherein all or some of the plurality of third diffractive elements of each layer of the substrate are inclined by a predetermined angle based on a waveguide direction from the third diffractive elements to the second diffractive elements.

12. The optical apparatus of claim 1, further comprising:
an image generator which generates a plurality of shift images whose total number corresponds to the number of layers of the at least one layer of the substrate and inputs the plurality of shift images as collimated beams to the at least one first diffractive element of each layer of the substrate.

13. The optical apparatus of claim 12,
wherein the image generator sequentially outputs the plurality of shift images; and
wherein the optical apparatus further comprises:
a blocking unit that is located in front of the at least one first diffractive element of each layer of the substrate and transmits or blocks a shift image in synchronization with an output sequence of the shift images of the image generator.

14. The optical apparatus of claim 12, wherein the image generator generates the shift images to be input to the at least one first diffractive element of each layer of the substrate on the basis of an output position of a beamlet output from the second diffractive elements of each layer of the substrate and depth information of a corresponding pixel, based on the center of a pupil.

15. The optical apparatus of claim 1, further comprising:
a light quantity controller which adjusts a quantity of light incident on a pupil such that the pupil is maintained at a constant size.

* * * * *